(12) United States Patent
Nakashima et al.

(10) Patent No.: US 11,015,076 B2
(45) Date of Patent: May 25, 2021

(54) INK COMPOSITION FOR REVERSIBLY THERMOCHROMIC STAMP AND STAMP

(71) Applicants: KABUSHIKI KAISHA PILOT CORPORATION, Tokyo (JP); THE PILOT INK CO., LTD., Aichi-ken (JP)

(72) Inventors: Akio Nakashima, Aichi-ken (JP); Hiroshi Umemoto, Aichi-ken (JP); Taeko Ozawa, Kanagawa-ken (JP)

(73) Assignees: KABUSHIKI KAISHA PILOT CORPORATION, Tokyo (JP); THE PILOT INK CO., LTD., Aichi-ken (JP)

( * ) Notice: Subject to any disclaimer, the term of this patent is extended or adjusted under 35 U.S.C. 154(b) by 127 days.

(21) Appl. No.: 15/305,447

(22) PCT Filed: Apr. 23, 2015

(86) PCT No.: PCT/JP2015/062412
§ 371 (c)(1),
(2) Date: Oct. 20, 2016

(87) PCT Pub. No.: WO2015/163421
PCT Pub. Date: Oct. 29, 2015

(65) Prior Publication Data
US 2017/0088737 A1    Mar. 30, 2017

(30) Foreign Application Priority Data

Apr. 24, 2014 (JP) .............................. JP2014-089834
Jun. 30, 2014 (JP) .............................. JP2014-134718
Jun. 30, 2014 (JP) .............................. JP2014-135035

(51) Int. Cl.
*C09D 11/50* (2014.01)
*B41K 1/50* (2006.01)
(Continued)

(52) U.S. Cl.
CPC ................ *C09D 11/50* (2013.01); *B41K 1/50* (2013.01); *B41K 1/52* (2013.01); *C09D 11/023* (2013.01);
(Continued)

(58) Field of Classification Search
None
See application file for complete search history.

(56) References Cited

U.S. PATENT DOCUMENTS 4,028,118 A    6/1977 Nakasuji et al.
5,620,777 A    4/1997 Goto et al.
(Continued)

FOREIGN PATENT DOCUMENTS

CN    102575123    7/2012
EP    2 138 550    12/2009
(Continued)

OTHER PUBLICATIONS

Extended European Search Report (Partial) dated Aug. 21, 2017 in corresponding European patent application No. 15 783 234.6.
(Continued)

*Primary Examiner* — Joshua D Zimmerman
(74) *Attorney, Agent, or Firm* — Wenderoth, Lind & Ponack, L.L.P.

(57) ABSTRACT

An ink composition for a reversibly thermochromic stamp including a reversibly thermochromic microencapsulated pigment encapsulating a reversibly thermochromic composition including:

Component (A): an electron-donating color-developing organic compound,

Component (B): an electron-accepting compound, and
(Continued)

Component (C): a reaction medium causing reversibly an electron transfer reaction between the Component (A) and the Component (B) in a specific temperature range, water and a thickener.

9 Claims, 3 Drawing Sheets

(51) Int. Cl.
*C09D 11/17* (2014.01)
*B41K 1/52* (2006.01)
*C09D 11/18* (2006.01)
*C09D 11/023* (2014.01)
*C09D 11/037* (2014.01)
*C09D 11/107* (2014.01)

(52) U.S. Cl.
CPC .......... *C09D 11/037* (2013.01); *C09D 11/107* (2013.01); *C09D 11/17* (2013.01); *C09D 11/18* (2013.01)

(56) References Cited

U.S. PATENT DOCUMENTS

| | | | |
|---|---|---|---|
| 5,970,868 A | 10/1999 | Kimura et al. | |
| 2010/0120614 A1* | 5/2010 | Ono | C09K 9/02 503/226 |
| 2013/0029257 A1 | 1/2013 | Fujita et al. | |

FOREIGN PATENT DOCUMENTS

| | | |
|---|---|---|
| EP | 2 626 398 | 8/2013 |
| JP | 51-44707 | 11/1976 |
| JP | 51-47706 | 11/1976 |
| JP | 56-151586 | 11/1981 |
| JP | 64-29398 | 1/1989 |
| JP | 4-17154 | 1/1992 |
| JP | 7-33997 | 2/1995 |
| JP | 7-149032 | 6/1995 |
| JP | 7-179777 | 7/1995 |
| JP | 8-39936 | 2/1996 |
| JP | 9-109534 | 4/1997 |
| JP | 10-279853 | 10/1998 |
| JP | 11-5973 | 1/1999 |
| JP | 11-129623 | 5/1999 |
| JP | 2001-105732 | 4/2001 |
| JP | 2001-192588 | 7/2001 |
| JP | 2002-121427 | 4/2002 |
| JP | 2002121427 A * | 4/2002 |
| JP | 2003-253149 | 9/2003 |
| JP | 2005-96154 | 4/2005 |
| JP | 2005096154 A * | 4/2005 |
| JP | 2008-280523 | 11/2008 |
| JP | 2008296372 A * | 12/2008 |
| JP | 2009-24137 | 2/2009 |
| JP | 2011-57913 | 3/2011 |
| JP | 2011-153321 | 8/2011 |
| JP | 2013-146969 | 8/2013 |
| WO | 2011/058652 | 5/2011 |

OTHER PUBLICATIONS

International Preliminary Report on Patentability dated Oct. 25, 2016 in corresponding International Application No. PCT/JP2015/062412.

International Search Report dated Aug. 4, 2015 in International Application No. PCT/JP2015/062412.

Office Action dated Jan. 31, 2019 in Chinese Patent Application No. 201580021312.3, with English-language.

* cited by examiner

INK COMPOSITION FOR REVERSIBLY THERMOCHROMIC STAMP AND STAMP

BACKGROUND OF THE INVENTION

Field of the Invention

The present invention relates to an ink composition for a reversibly thermochromic stamp and a stamp.

Background Art

An ink composition for a reversibly thermochromic stamp using as a colorant a reversibly thermochromic microencapsulated pigment encapsulating a reversibly thermochromic composition containing a Component (A): an electron-donating color-developing organic compound, a Component (B): an electron-accepting compound, and a Component (C): a reaction medium to determine an occurrence temperature of a coloring reaction of the two has been heretofore disclosed (for example, see Patent Literature 1).

A stamp image formed by the ink composition for a reversibly thermochromic stamp can be decolored by heating. However, there has been a risk of decoloration due to unintended heating in a case where such a stamp image is left to stand in a high temperature environment such as inside a closed automobile cabin in summer. Therefore, it has been possible that a stamp image made on an important document, etc., may be decolored unintentionally, and an intended purpose is not achieved.

Meanwhile, an self-inking type stamp provided with a stamp material having continuous pores using an ink composition containing a common dye, pigment, etc. has been heretofore known. Since with such a self-inking type stamp, successive direct stamping, without pressing a stamp face on to an ink pad at each stamping, is possible, it offers excellent usability. (For example, Patent Literature 2).

Since in the case of the self-inking type stamp, the stamp face touches directly a surface to be stamped, the condition of the stamp face has strong influence on the quality of a stamp image, such as resolution, clearness, and sharpness of a stamp image, and successive stamping performance. Further, since an ink composition is transferred from the stamp face to a surface to be stamped through continuous pores, a combination with an ink composition exerts strong influence on the quality of a stamp image. Even when the above ink composition for a reversibly thermochromic stamp is used for a self-inking type stamp, a similar influence may be exerted. For example, a stamp image may be blurred, discharge of an ink composition may become uneven, or successive stamping may be unpractical, and therefore it has been in need of improvement.

Further, the flowability of a microencapsulated pigment in a continuous pore may be occasionally insufficient, and as the result a sufficient supply of an ink composition to the stamp face may not be secured, so that repeated formation of clear stamp images by successive stamping operations may not be possible, and therefore it has been in need of improvement.

CITATION LIST

Patent Literature

[Patent Literature 1] Japanese Unexamined Patent Application Publication No. 2002-121427

[Patent Literature 2] Japanese Unexamined Patent Application Publication No. 2005-96154

SUMMARY OF THE INVENTION

Technical Problem

The present invention provides an ink composition for a reversibly thermochromic stamp, a stamp image of which does not decolor even when the same is left to stand in a high temperature environment, and a stamp containing the same.

Further, the present invention provides an ink composition for a reversibly thermochromic stamp, with which a stamp image does not blur and the ink composition can be supplied sufficiently to a stamp face enabling successive stamping operations to form repeatedly clear stamp images, even when the composition is used for a stamp provided with a stamp material having continuous pores, and a stamp containing the composition.

Further, a reversibly thermochromic stamp is provided, which is able to stamp successively without uneven discharge of an ink composition and to form a clear and sharp stamp image without blurring or fouling, by keeping a certain relationship between the average distance of depressions and projections of an ink impregnating surface of a stamp material and the average particle size of a microencapsulated pigment.

Solution to Problem

An ink composition for a reversibly thermochromic stamp of a first aspect according to the present invention comprises
a reversibly thermochromic microencapsulated pigment encapsulating a reversibly thermochromic composition comprising:
Component (A): an electron-donating color-developing organic compound,
Component (B): an electron-accepting compound, and
Component (C): a reaction medium causing reversibly an electron transfer reaction between the Component (A) and the Component (B) in a specific temperature range;
water; and
a thickener,
wherein:
the reversibly thermochromic composition exhibits a 1st hue at a temperature $t_1$, and exhibits a 2nd hue at a temperature $t_4$ higher than the temperature $t_1$, and coloring can be altered reciprocally between the 1st hue and the 2nd hue by changing the temperature;
the reversibly thermochromic composition exhibiting the 1st hue at the temperature $t_1$ starts color change at a temperature $t_3$, when the temperature is elevated, and exhibits completely the 2nd hue in a temperature range not lower than the temperature $t_4$ higher than the temperature $t_3$;
the reversibly thermochromic composition exhibiting the 2nd hue at the temperature $t_4$ starts color change at a temperature $t_2$, when the composition is cooled, and exhibits completely the 1st hue in a temperature range not higher than the temperature $t_1$ lower than the temperature $t_2$;
a hysteresis property to keep the 1st hue or the 2nd hue in a temperature range between the temperature $t_2$ and the temperature $t_3$ is indicated; and
the temperature $t_2$ is a temperature not higher than 15° C., and the temperature $t_4$ is a temperature not lower than 80° C.

An ink composition for a reversibly thermochromic stamp of a second aspect according to the present invention comprises a reversibly thermochromic microencapsulated pigment encapsulating a reversibly thermochromic composition comprising:

Component (A): an electron-donating color-developing organic compound,

Component (B): an electron-accepting compound, and

Component (C): a reaction medium causing reversibly an electron transfer reaction between the Component (A) and the Component (B) in a specific temperature range;

water; and a thickener, wherein:

an ink composition viscosity measured at 25° C. with a BL-type viscometer at 6 rpm is from 3,000 to 10,000 mPa·s, and a thixotropy expressed by (ink composition viscosity measured at 6 rpm)/(ink composition viscosity measured at 60 rpm) is from 1.1 to 2.5.

A stamp of a third aspect according to the present invention is provided with a stamp material having continuous pores impregnated with an ink composition for a reversibly thermochromic stamp containing a reversibly thermochromic microencapsulated pigment encapsulating a reversibly thermochromic composition comprising:

Component (A): an electron-donating color-developing organic compound;

Component (B): an electron-accepting compound; and

Component (C): a reaction medium causing reversibly an electron transfer reaction between the Component (A) and the Component (B) in a specific temperature range, wherein:

the stamp material has an ink impregnating surface with pores allowing impregnation of an ink, and an ink non-impregnating surface rejecting impregnation of an ink; and P expressed by the following formula is 30 or higher:

$$P=Sm^2/D^2$$

wherein Sm stands for an average distance of depressions and projections of the ink impregnating surface of the stamp material, and D stands for an average particle size of the microencapsulated pigment.

Advantageous Effects of Invention

According to an aspect of the present invention, a stamp, which is able to reduce blurring of a stamp image formed by stamping, and mitigate unevenness in discharge of an ink composition, and is suitable for successive stamping, is provided. More specifically, the present invention provides a stamp having superior characteristics as described below.

According to the present invention, an ink composition for a reversibly thermochromic stamp, and a stamp containing the same may be provided, which are eligible for practical use achieving intended objectives of a stamp image, such that, even if a stamp image is left to stand in an unintendedly high temperature environment, the image is not decolored and remains visible.

According to the present invention, an ink composition for a reversibly thermochromic stamp, and a stamp containing the same may be provided, which offers practical utility, such that, even in a case used in a stamp provided with a stamp material having continuous pores, a stamp image does not blur and clear stamp images can be formed repeatedly by successive stamping operations owing to smooth flowability of the ink composition to a stamp face.

According to the present invention, when a certain relationship between the average distance of depressions and projections of an ink impregnating surface of a stamp material and the average particle size of a microencapsulated pigment is maintained, a stamp image is not stained, and further not blurred. Moreover, a superior effect can be obtained, such that a stamp image can be clear and sharp

DETAILED DESCRIPTION OF THE INVENTION

Figure 1:
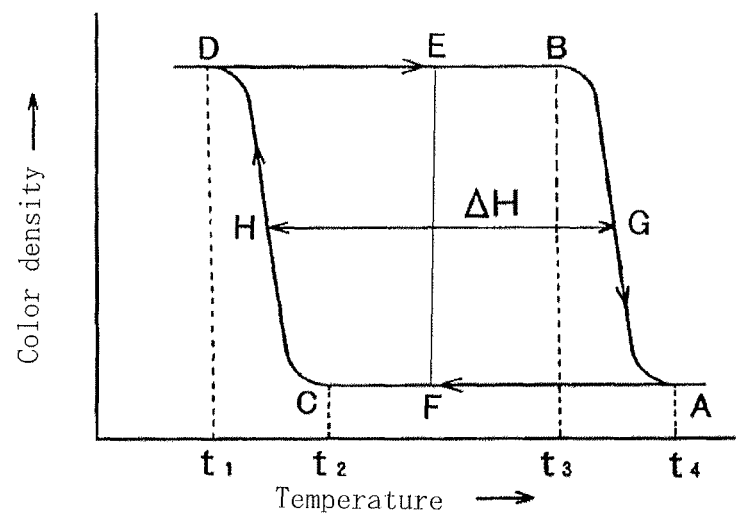
FIG. 1 is an explanatory diagram showing a color change behavior of a microencapsulated pigment containing a reversibly thermochromic composition.

<An Ink Composition for a Reversibly Thermochromic Stamp According to the First Embodiment>

An ink composition for a reversibly thermochromic stamp according to the first embodiment of the present invention comprises a reversibly thermochromic microencapsulated pigment encapsulating a reversibly thermochromic composition comprising:

Component (A): an electron-donating color-developing organic compound,

Component (B): an electron-accepting compound, and

Component (C): a reaction medium causing reversibly an electron transfer reaction between the Component (A) and the Component (B) in a specific temperature range;

water; and a thickener.

An ink composition may contain a binder resin for adjusting adhesion of a stamp image or viscosity.

Various additives, such as an antioxidant, a UV absorber, an infrared light absorber, a solubilizing agent, a pH adjuster, an aseptic or antifungal agent, and a nonthermochromic dye or pigment, may be added to an ink composition to the extent that the function thereof is not affected.

The ink composition has an ink composition viscosity measured at 25° C. with a BL-type viscometer at 6 rpm of preferably from 3,000 to 10,000 mPa·s, more preferably from 3,500 to 7,000 mPa·s, and further preferably from 4,000 to 6,000 mPa·s. Meanwhile, the thixotropy (ink composition viscosity measured at 6 rpm)/(ink composition viscosity measured at 60 rpm) is preferably from 1.1 to 2.5, and more preferably from 1.2 to 2.0

When the ink composition viscosity is 3,000 mPa·s or more, blurring of a stamp image formed on a paper surface using an ink composition can be prevented. When the ink composition viscosity is 10,000 mPa·s or less, it is possible to prevent that an indistinct stamp image is formed by successive stamping operations, as the consequence that the flowability of a microencapsulated pigment in continuous pores becomes insufficient, and smooth flow of the ink composition on to a stamp face cannot be secured any more.

When the thixotropy is 1.1 or more, blurring of a stamp image formed on a paper surface using an ink composition can be prevented. When it is 2.5 or less, it is possible to prevent that an indistinct stamp image is formed by successive stamping operations, as the consequence that the flowability of a microencapsulated pigment in continuous pores becomes insufficient, and as the result smooth flow of the ink composition on to a stamp face cannot be secured any more.

The blending ratio of the reversibly thermochromic microencapsulated pigment with respect to the total amount of an ink composition is preferably from 10 to 40 mass %, more preferably from 10 to 35 mass %, and further preferably from 10 to 30 mass %. When the blending ratio is in the above numerical range, decrease in color optical density can be prevented, and sufficient dispersion stability of the ink composition can be maintained.

A reversibly thermochromic microencapsulated pigment encapsulating a reversibly thermochromic composition comprising Component (A): an electron-donating color-developing organic compound, Component (B): an electron-accepting compound, and Component (C): a reaction medium causing reversibly an electron transfer reaction between the Component (A) and the Component (B) in a specific temperature range, will be described below.

(Reversibly Thermochromic Microencapsulated Pigment)

A hysteresis property with respect to a color density-temperature curve of the microencapsulated pigment encapsulating a reversibly thermochromic composition will be described by way of a graph in FIG. 1. FIG. 1 is a graph showing as an example a case where the 1st hue is a colored state, and the 2nd hue is a decolored state.

In FIG. 1 the ordinate represents color density, and the abscissa represents temperature. The color density change by temperature change progresses along the arrow. In this regard, A is a point indicating a density at temperature $t_4$ where a completely decolored state is reached (hereinafter referred to as "completely decolored temperature"), B is a point indicating a density at temperature $t_3$ where decoloration starts (hereinafter referred to as "decoloration initiation temperature"), C is a point indicating a density at temperature $t_2$ where coloration starts (hereinafter referred to as "coloration initiation temperature"), and D is a point indicating a density at temperature $t_1$ where a completely colored state is reached (hereinafter referred to as "completely colored temperature").

A thermochromic range is a temperature range between the $t_1$ and the $t_4$, and a temperature range between the $t_2$ and the $t_3$ is an actual color change temperature range, namely a temperature range where either of a colored state or a decolored state can be retained.

Specifically, by cooling a reversibly thermochromic microencapsulated pigment in a decolored state to a temperature to the coloration initiation temperature or lower, change to a colored state can be initiated, and by cooling the same to the completely colored temperature or lower the same can be led to a completely colored state, which can be maintained, unless the temperature of the reversibly thermochromic microencapsulated pigment is raised to the coloration initiation temperature.

When a heat generated by friction or the like is applied to a reversibly thermochromic microencapsulated pigment in the colored state up to a temperature not lower than the decoloration initiation temperature, a change to the decolored condition can be initiated; and by heating to a temperature not lower than the completely decolored temperature, the completely decolored state can be attained, which can be maintained, unless the temperature of the reversibly thermochromic microencapsulated pigment is lowered to the coloration initiation temperature.

The length of the line segment EF is a scale for the contrast of a color change, and the length of the line segment HG is a temperature width indicating the degree of hysteresis (hereinafter referred to as "hysteresis width ΔH"). The larger the ΔH value is, the easier the maintenance of the respective states before and after a color change is.

In this regard, the difference between $t_4$ and $t_3$, or the difference between $t_2$ and $t_1$ (Δt) is a measure of the sensitivity of a color change.

In order that specific one state (colored state) of the colored and decolored states of a reversibly thermochromic composition can solely exist in a normal temperature range, and that a stamp image with the reversibly thermochromic composition can be decolored by heat from a heating erasing device, etc., it is preferable for the completely decolored temperature ($t_4$) to be 50° C. or higher, and for the coloration initiation temperature ($t_2$) to be 15° C. or lower.

According to the first embodiment, the completely decolored temperature ($t_4$) is more preferably 80° C. or higher.

When heating of a stamp image is carried out from the colored state through the decoloration initiation temperature ($t_3$), and stopped before arriving at the completely decolored temperature ($t_4$), the stamp image ordinarily returns to the colored state. Meanwhile, when cooling of a stamp image is carried out from the decolored state through the coloration initiation temperature ($t_2$), and stopped before arriving at the completely colored temperature ($t_1$), a coloring-initiated state is maintained. In a case where the completely decolored temperature ($t_4$) is 80° C. or higher, namely exceeds a normal temperature range, even if a stamp image is stored in a high temperature environment, as inside a car in summertime, namely in an environment where unintended heating may occur, the colored state of a stamp image can be maintained. Meanwhile, in a case where the coloration initiation temperature ($t_2$) is 15° C. or lower, namely falls below a normal temperature range, the decolored state of a stamp image can be maintained in an ordinary environment.

Further, in a case where the completely decolored temperature ($t_4$) is 90° C. or higher according to the first embodiment, the colored state of a stamp image can be maintained in a higher temperature environment, and it is preferable that the coloration initiation temperature ($t_2$) is 10° C. or lower because the decolored state of a stamp image is better maintained in an ordinary environment.

Therefore, the setup of the temperatures is an important requirement for visualizing alternatively a stamp image in a color-changed state on a target surface, through which a stamp image can achieve an intended objective.

For temperature-setting of the completely decolored temperature ($t_4$) a higher temperature is preferable in order to maintain the colored state in a high temperature environment, and the completely decolored temperature ($t_4$) is preferably from 90 to 200° C., and more preferably from 100 to 150° C.

Further, for temperature-setting of the coloration initiation temperature ($t_2$), a lower temperature is preferable in order to maintain the decolored state in an ordinary environment, and −50 to 10° C. is preferable, and −50 to 5° C. is more preferable.

As a cooling means for making a reversibly thermochromic composition into a colored state in advance, cooling in a general-purpose freezer is preferable. In this case −50° C.

is a lower limit considering the cooling capacity of a freezer, and therefore the completely colored temperature ($t_1$) is ordinarily −50° C. or higher.

According to the present invention, a hysteresis width (ΔH) is preferably from 50° C. to 150° C., and in the first embodiment it is more preferably in a range between 70° C. and 150° C.

The average particle size of the reversibly thermochromic microencapsulated pigment is preferably from 0.1 μm to 15 μm. When the average particle size of the microcapsules is 15 μm or less, the dispersion stability in an ink composition can be improved; and when the average particle size is 0.1 μm or more, a high density coloring property can be developed. It is more preferably from 0.1 μm to 10 μm, and below the range, bleed-through of an obtained stamp image from a paper surface tends to occur. Additionally, a stamp image loses its clearness, because as a colorant the color optical density is lowered. Further, occasionally it may become difficult to disperse a microencapsulated pigment stably in an ink composition. In this case, pigment particles are apt to coagulate, which makes it difficult for an ink composition to flow in a continuous pore. As the result, supply of an ink composition becomes insufficient, so that a stamp image may become too thin, or successive stamping may become impossible. The average particle size of the reversibly thermochromic microencapsulated pigment is further preferably from 0.1 μm to 7 μm, and still further preferably from 0.3 μm to 5 μm. Within the range, a stamp image to be obtained becomes clear and sharp, a high quality stamp image is obtainable even by successive stamping, and a microencapsulated pigment can easily penetrate into fibers on a paper surface, so that a stamp image is resistant to detachment by friction with hand or the like, and thinning of a stamp image in use can be prevented. Especially preferable is 0.5 μm to 5 μm. In this regard, an average particle size is measured using a laser diffraction/scattering particle size distribution analyzer (LA-300, produced by Horiba, Ltd.) and a volumetric average particle size (median diameter) is calculated based on the measured value.

Examples of a method of microencapsulation for a reversibly thermochromic composition include an interfacial polymerization method, an interfacial polycondensation method, an in situ polymerization process, an in-liquid curing method, a phase separation method from an aqueous solution, a phase separation method from an organic solvent, a fusion-dispersion cooling method, an air-suspension coating method, and a spray drying method, which may be selected appropriately according to an intended use. Further, a secondary resin coating may be provided on a surface of a microcapsule according to need to impart durability, or the surface may be modified for a practical use.

In this regard, the mass ratio of a reversibly thermochromic composition to a microcapsule wall film is preferably from 7:1 to 1:1, and more preferably from 6:1 to 1:1. When the mass ratio of a reversibly thermochromic composition to a wall film is within the numerical range as described above, decrease in resistance to pressure or heat can be prevented, and at the same time the color density and clearness during color development can be improved.

(Reversibly Thermochromic Composition)

A reversibly thermochromic composition is encapsulated by a microcapsule wall film and used as a reversibly thermochromic microencapsulated pigment. This is because the reversibly thermochromic composition can maintain the same composition and the same working-effect can be obtained under various operation conditions.

Components (A), (B), and (C) composing a reversibly thermochromic composition will be described below.

Component (A) according to the present invention is an electron-donating color-developing organic compound, which develops a color by donating an electron to Component (B) which is a developer, opening a cyclic structure such as a lactone ring of Component (A), and forming a resonance structure with Component (B). Examples of such an electron-donating color-developing organic compound include a phthalide compound, a fluoran compound, a styrynoquinoline compound, a diazarhodamine-lactone compound, a pyridine compound, a quinazoline compound, and a bisquinazoline compound.

In this regard, a fluoran compound may be a compound having a substituent in a phenyl group to form a xanthene ring, or a blue- or black coloring compound having a substituent in a phenyl group forming a xanthene ring, and also having a substituent (for example, an alkyl group such as a methyl group, and a halogen atom such as a chloro group) in a phenyl group forming a lactone ring.

Examples of a phthalide compound include a diphenylmethane phthalide compound, a phenylindolylphthalide compound, an indolylphthalide compound, a diphenylmethane azaphthalide compound, a phenylindolyl azaphthalide compound, and derivatives thereof. Examples of a fluoran compound include an aminofluoran compound, an alkoxyfluoran compound, and derivatives thereof.

Examples of such compounds are listed below.
3,3-bis(p-dimethylaminophenyl)-6-dimethylaminophthalide,
3-(4-diethylaminophenyl)-3-(1-ethyl-2-methylindol-3-yl)phthalide,
3,3-bis(1-n-butyl-2-methylindol-3-yl)phthalide,
3,3-bis(2-ethoxy-4-diethylaminophenyl)-4-azaphthalide,
3-[2-ethoxy-4-(N-ethylanilino)phenyl]-3-(1-ethyl-2-methylindol-3-yl)-4-azaphthalide,
3,6-diphenylaminofluoran,
3,6-dimethoxyfluoran,
3,6-di-n-butoxyfluoran,
2-methyl-6-(N-ethyl-n-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methyl-6-di-n-butylaminofluoran,
2-xylidino-3-methyl-6-diethylaminofluoran,
1,2-benz-6-diethylaminofluoran,
1,2-benz-6-(N-ethyl-n-isobutylamino)fluoran,
1,2-benz-6-(N-ethyl-n-isoamylamino)fluoran,
2-(3-methoxy-4-dodecoxystyryl)quinoline,
spiro[5H-(1)benzopyrano(2,3-d)pyrimidine-5,1'(3'H)isobenzofuran]-3'-one,
2-(diethylamino)-8-(diethylamino)-4-methyl-spiro[5H-(1)benzopyrano(2,3-g)pyrimidine-5,1'(3'H)isobenzofuran]-3-one,
2-(di-n-butylamino)-8-(di-n-butylamino)-4-methyl-spiro[5H-(1)benzopyrano(2,3-g)pyrimidine-5,1'(3'H)isobenzofuran]-3-one,
2-(di-n-butylamino)-8-(diethylamino)-4-methyl-spiro[5H-(1)benzopyrano(2,3-g)pyrimidine-5,1'(3'H)isobenzofuran]-3-one, 2-(di-n-butylamino)-8-(N-ethyl-N-isoamylamino)-4-methyl-spiro[5H-(1)benzopyrano(2,3-g)pyrimidine-5,1'(3'H)isobenzofuran]-3-one,
2-(dibutylamino)-8-(dipentylamino)-4-methyl-spiro[5H-(1)benzopyrano(2,3-g)pyrimidine-5,1'(3'H)-isobenzofuran]-3-one,
3-(2-methoxy-4-dimethylaminophenyl)-3-(1-butyl-2-methylindol-3-yl)-4,5,6,7-tetrachlorophthalide,
3-(2-ethoxy-4-diethylaminophenyl)-3-(1-ethyl-2-methylindol-3-yl)-4,5,6,7-tetrachlorophthalide,
3-(2-ethoxy-4-diethylaminophenyl)-3-(1-pentyl-2-methylindol-3-yl)-4,5,6,7-tetrachlorophthalide,
4,5,6,7-tetrachloro-3-[4-(dimethylamino)-2-methylphenyl]-3-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthen]-3-one,
3',6'-bis[phenyl(3-ethylphenyl)amino]-spiro[isobenzofuran-1(3H),9'-[9H]xanthen]-3-one,
4-[2,6-bis(2-ethoxyphenyl)-4-pyridinyl]-N,N-dimethylbenzenamine,
2-(4'-dimethylaminophenyl)-4-methoxy quinazoline, and
4,4'-(ethylenedioxy)-bis[2-(4-diethylaminophenyl)quinazoline]

An electron-accepting compound of Component (B) is a compound which accepts an electron from Component (A) and functions as a developer for Component (A), and examples thereof include compounds having an active proton, pseudo acidic compounds (compounds that are not acids but able to make Component (A) develop a color by functioning as an acid in a composition), and compounds having an electron hole.

As an example of a compound having an active proton, a compound having a phenolic hydroxy group may be a monophenol compound, or a polyphenol compound, and the compound may have a substituent. Examples of the substituent include an alkyl group, an aryl group, an acyl group, an alkoxycarbonyl group, a carboxy group, and an ester thereof, an amido group, and a halogen group. Examples of the compounds include a bis-type, or tris-type phenol, and a phenol-aldehyde condensation resin. A metal salt of the compound having a phenolic hydroxy group is also appropriate.

Specific examples of a compound having an active proton are listed below.
phenol,
o-cresol,
tert-butylcatechol,
nonylphenol,
n-octylphenol,
n-dodecylphenol,
n-stearylphenol,
p-chlorophenol,
p-bromophenol,
o-phenylphenol,
n-butyl p-hydroxybenzoate,
n-octyl p-hydroxybenzoate,
resorcin,
dodecyl gallate,
2,2-bis(4-hydroxyphenyl)propane,
4,4-dihydroxydiphenylsulfone,
1,1-bis(4-hydroxyphenyl)ethane,
2,2-bis(4-hydroxy-3-methylphenyl)propane,
bis(4-hydroxyphenyl)sulfide,
1-phenyl-1,1-bis(4-hydroxyphenyl)ethane,
1,1-bis(4-hydroxyphenyl)-3-methylbutane,
1,1-bis(4-hydroxyphenyl)-2-methylpropane,
1,1-bis(4-hydroxyphenyl)-n-hexane,
1,1-bis(4-hydroxyphenyl)-n-heptane,
1,1-bis(4-hydroxyphenyl)-n-octane,
1,1-bis(4-hydroxyphenyl)-n-nonane
1,1-bis(4-hydroxyphenyl)-n-decane,
1,1-bis(4-hydroxyphenyl)-n-dodecane,
1,1-bis(4-hydroxyphenyl)-2-ethylhexane,
2,2-bis(4-hydroxyphenyl)butane,
2,2-bis(4-hydroxyphenyl)ethyl propionate,
2,2-bis(4-hydroxyphenyl)-4-methylpentane,
2,2-bis(4-hydroxyphenyl)hexafluoropropane,
2,2-bis(4-hydroxyphenyl)-n-heptane, and
2,2-bis(4-hydroxyphenyl)-n-nonane.

The compound having a phenolic hydroxy group is especially preferable, because a most effective thermochromic property can be developed. In addition to a compound having a phenolic hydroxy group, a compound selected out of an aromatic carboxylic acid, a C2 to C5 aliphatic carboxylic acid, a metal salt of a carboxylic acid, an acidic phosphoric ester and a metal salt thereof, and a 1,2,3-triazole and a derivative thereof, may be used.

Examples of Component (C), which is a reaction medium causing reversibly an electron transfer reaction between the Component (A) and the Component (B) in a specific temperature range, include an alcohol compound, an ester compound, a ketone compound, and an ether compound.

For stable retention in a capsule, a C10 or higher compound is favorably used as Component (C), because a low molecular weight compound evaporates out of a capsule when treated at a high temperature.

As an alcohol compound, a C10 or higher aliphatic monohydric saturated alcohol compound is preferable. Specific examples thereof include decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and dococyl alcohol.

As an ester compound, a C10 or higher ester compound is preferable. Examples thereof include (1) an ester compound obtained by any optional combination of a monobasic carboxylic acid having an aliphatic group, and an alicyclic or aromatic ring, and a monohydric alcohol having an aliphatic group, and an alicyclic or aromatic ring; (2) an ester compound obtained by any optional combination of a polybasic carboxylic acid having an aliphatic group, and an alicyclic or aromatic ring, and a monohydric alcohol having an aliphatic group, and an alicyclic or aromatic ring; and (3) an ester compound obtained by any optional combination of a monobasic carboxylic acid having an aliphatic group, and an alicyclic or aromatic ring, and a polyhydric alcohol having an aliphatic group, and an alicyclic or aromatic ring.

More specific examples of an ester compound include:
ethyl caprylate,
octyl caprylate,
stearyl caprylate,
myristyl caprate,
dococyl caprate,
2-ethylhexyl laurate,
n-decyl laurate,
3-methylbutyl myristate,
cetyl myristate,
isopropyl palmitate,
neopentyl palmitate,
nonyl palmitate,
cyclohexyl palmitate, n-butyl stearate,
2-methylbutyl stearate,
3,5,5-trimethylhexyl stearate,
n-undecyl stearate,
pentadecyl stearate,
stearyl stearate,
cyclohexylmethyl stearate,
isopropyl behenate,
hexyl behenate,
lauryl behenate
behenyl behenate,
cetyl benzoate,
stearyl p-tert-butylbenzoate,
dimyristyl phthalate,
distearyl phthalate,
dimyristyl oxalate,
dicetyl oxalate,
dicetyl malonate,
dilauryl succinate,
dilauryl glutarate
diundecyl adipate,
dilauryl azelate,
di-(n-nonyl) sebacate,
dineopentyl 1,18-octadecylmethylene dicarboxylate,
ethylene glycol dimyristate,
propylene glycol dilaurate,
propylene glycol distearate,
hexylene glycol dipalmitate,
1,5-pentanediol distearate,
1,2,6-hexanetriol trimyristate,
1,4-cyclohexanediol didecyl,
1,4-cyclohexanedimethanol dimyristate,
xylene glycol dicaprinate, and
xylene glycol distearate.

In this regard, an ester compound selected out of (4) an ester compound between a saturated fatty acid and a branched aliphatic alcohol; (5) an ester compound between an unsaturated fatty acid, or a saturated fatty acid having a branch or a substituent, and a branched or C16 or higher aliphatic alcohol; and (6) cetyl butyrate, stearyl butyrate, and behenyl butyrate, is also preferable.

Specific examples of such an ester compound include:
2-ethylhexyl butyrate,
2-ethylhexyl behenate,
2-ethylhexyl myristate,
2-ethylhexyl caprate,
3,5,5-trimethylhexyl laurate,
3,5,5-trimethylhexy palmitate,
3,5,5-trimethylhexyl stearate,
2-methylbutyl caproate,
2-methylbutyl caprylate,
2-methylbutyl caprate,
1-ethylpropyl palmitate,
1-ethylpropyl stearate,
1-ethylpropyl behenate,
1-ethylhexyl laurate,
1-ethylhexyl myristate,
1-ethylhexyl palmitate,
2-methylpentyl caproate,
2-methylpentyl caprylate,
2-methylpentyl caprate,
2-methyl pentyl laurate,
2-methylbutyl stearate,
3-methylbutyl stearate,
1-methylheptyl stearate,
2-methylbutyl behenate,
3-methylbutyl behenate,
1-methylheptyl stearate,
1-methylheptyl behenate,
1-ethylpentyl caproate,
1-ethylpentyl palmitate,
1-methylpropyl stearate,
1-methyloctyl stearate,
1-methylhexyl stearate,
1,1-dimethylpropyl laurate,
1-methylpentyl caprate,
2-methylhexyl palmitate,
2-methylhexyl stearate,
2-methylhexyl behenate,
3,7-dimethyloctyl laurate,
3,7-dimethyloctyl myristate,
3,7-dimethyloctyl palmitate,
3,7-dimethyloctyl stearate,
3,7-dimethyloctyl behenate,
stearyl oleate,
behenyl oleate,
stearyl linoleate,
behenyl linoleate,
3,7-dimethyloctyl erucate,
stearyl erucate,
isostearyl erucate,
cetyl isostearate,
stearyl isostearate,
2-methylpentyl 12-hydroxystearate,
2-ethylhexyl 18-bromostearate,
isostearyl 2-ketomyristate,
2-ethylhexyl 2-fluoromyristate,
cetyl butyrate,
stearyl butyrate, and
behenyl butyrate.

As a Component (C) for obtaining a reversibly thermochromic composition having a color memory property, a carboxylic ester compound exhibiting a ΔT value (melting point–cloudy point) of 5° C. or more and less than 50° C. may be also used. Examples thereof include (1) a carboxylic ester compound having a substituted aromatic ring in the molecule, (2) a carboxylic ester compound between a carboxylic acid having an unsubstituted aromatic ring and a C10 or more aliphatic alcohol, (3) a carboxylic ester having a cyclohexyl group in the molecule, (4) a carboxylic ester compound between a C6 or more fatty acid and an unsubstituted aromatic alcohol or phenol, (5) a carboxylic ester compound between a C8 or more fatty acid and a branched aliphatic alcohol, and (6) a carboxylic ester compound between a dicarboxylic acid and an aromatic alcohol or a branched aliphatic alcohol. More specifically, examples thereof include dibenzyl cinnamate, heptyl stearate, didecyl adipate, dilauryl adipate, dimyristyl adipate, dicetyl adipate, distearyl adipate, Trilaurin, Trimyristin, Tristearin, Dimyristin, and Distearin.

Further, (7) a fatty acid ester compound obtained from an aliphatic monohydric alcohol having an odd number not less than 9 of carbon atoms, and an aliphatic carboxylic acid having an even number of carbon atoms, and (8) a fatty acid ester compound with a total carbon number of 17 to 23 to be obtained from n-pentyl alcohol or n-heptyl alcohol and an aliphatic carboxylic acid having an even number from 10 to 16 of carbon atoms, are also preferable.

Specific examples of such an ester compound include:
n-pentadecyl acetate,
n-tridecyl butyrate,
n-pentadecyl butyrate,
n-undecyl caproate,
n-tridecyl caproate, n-pentadecyl caproate,
n-nonyl caprylate,
n-undecyl caprylate,
n-tridecyl caprylate,
n-pentadecyl caprylate,
n-heptyl caprate,
n-nonyl caprate,
n-undecyl caprate,
n-tridecyl caprate,
n-pentadecyl caprate,
n-pentyl laurate,
n-heptyl laurate,
n-nonyl laurate,
n-undecyl laurate,
n-tridecyl laurate,
n-pentadecyl laurate,
n-pentyl myristate,
n-heptyl myristate,
n-nonyl myristate,
n-undecyl myristate,
n-tridecyl myristate,
n-pentadecyl myristate,
n-pentyl palmitate,
n-heptyl palmitate,
n-nonyl palmitate,
n-undecyl palmitate,
n-tridecyl palmitate,
n-pentadecyl palmitate,
n-nonyl stearate,
n-undecyl stearate,
n-tridecyl stearate,
n-pentadecyl stearate,
n-nonyl eicosanoate,
n-undecyl eicosanoate,
n-tridecyl eicosanoate,
n-pentadecyl eicosanoate,
n-nonyl behenate,
n-undecyl behenate,
n-tridecyl behenate, and
n-pentadecyl behenate.

In an embodiment as a ketone compound an aliphatic ketone compound with a total carbon number of 10 or more is preferable. Examples thereof include:
2-decanone,
3-decanone,
4-decanone,
2-undecanone,
3-undecanone,
4-undecanone,
5-undecanone,
2-dodecanone,
3-dodecanone,
4-dodecanone,
5-dodecanone,
2-tridecanone,
3-tridecanone,
2-tetradecanone,
2-pentadecanone,
8-pentadecanone,
2-hexadecanone,
3-hexadecanone,
9-heptadecanone,
2-pentadecanone,
2-octadecanone,
2-nonadecanone,
10-nonadecanone,
2-eicosanone,
11-eicosanone,
2-heneicosanone,
2-docosanone,
laurone, and
stearone In an embodiment as a ketone compound an aryl alkyl ketone compound with a total carbon number of 12 to 24 is preferable. Examples thereof include:
n-octadecanophenone,
n-heptadecanophenone,
n-hexadecanophenone,
n-pentadecanophenone,
n-tetradecanophenone,
4-n-dodecaacetophenone,
n-tridecanophenone,
4-n-undecanoacetophenone,
n-laurophenone,
4-n-decanoacetophenone,
n-undecanophenone,
4-n-nonylacetophenone,
n-decanophenone,
4-n-octylacetophenone,
n-nonanophenone,
4-n-heptylacetophenone,
n-octanophenone,
4-n-hexylacetophenone,
4-n-cyclohexylacetophenone,
4-tert-butylpropiophenone,
n-heptaphenone,
4-n-pentylacetophenone,
cyclohexyl phenyl ketone,
benzyl n-butyl ketone,
4-n-butylacetophenone,
n-hexanophenone,
4-isobutylacetophenone,
1-acetonaphthone,
2-acetonaphthone, and
cyclopentyl phenyl ketone As an ether an aliphatic ether compound with a total carbon number of 10 or more is preferable. Examples thereof include:
dipentyl ether,
dihexyl ether,
diheptyl ether,
dioctyl ether,
dinonyl ether,
didecyl ether,
diundecyl ether,
didodecyl ether,
ditridecyl ether,
ditetradecyl ether,
dipentadecyl ether,
dihexadecyl ether,
dioctadecyl ether,
decanediol dimethyl ether,
undecanediol dimethyl ether,
dodecanediol dimethyl ether,
tridecanediol dimethyl ether,
decanediol diethyl ether, and
undecanediol diethyl ether.

As Component (C), a compound expressed by the following general formula (1) may be used:

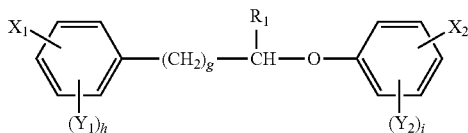

(1)

wherein $R_1$ represents a hydrogen atom, or a methyl group; g represents an integer from 0 to 2; either one of $X_1$, and $X_2$ represents —$(CH_2)_r OCOR_2$ or —$(CH_2)_r COOR_2$; the other represents a hydrogen atom; r represents an integer from 0 to 2; $R_2$ represents a C4 or higher alkyl or alkenyl group; $Y_1$ and $Y_2$ represent a hydrogen atom, a C1 to C4 alkyl group, a methoxy group, or a halogen; and h and i represent an integer from 1 to 3.

Among compounds expressed by the Formula (1), those in which $R_1$ is a hydrogen atom are favorable, because a reversibly thermochromic composition with a wide hysteresis width is obtainable, and those in which $R_1$ is a hydrogen atom and g is 0 are more favorable.

Among compounds expressed by Formula (1), compounds expressed by the following general formula (2) are used more preferably:

(2)

wherein $R_2$ represents a C8 or higher alkyl or alkenyl group, is preferably a C10 to C24 alkyl group, and more preferably a C12 to C22 alkyl group.

Specific examples of the compounds include:
4-benzyloxyphenylethyl octanoate,
4-benzyloxyphenylethyl nonanoate,
4-benzyloxyphenylethyl decanoate,
4-benzyloxyphenylethyl undecanoate,
4-benzyloxyphenylethyl dodecanoate,
4-benzyloxyphenylethyl tridecanoate,
4-benzyloxyphenylethyl tetradecanoate,
4-benzyloxyphenylethyl pentadecanoate,
4-benzyloxyphenylethyl hexadecanoate,
4-benzyloxyphenylethyl heptadecanoate, and
4-benzyloxyphenylethyl octadecanoate.

Further, in an embodiment, a compound expressed by the following general formula (3) may be used as the Component (C):

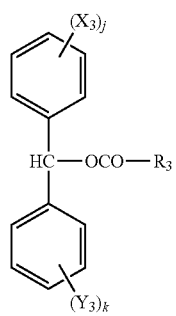

(3)

wherein R represents a C8 or higher alkyl or alkenyl group; j and k independently represent an integer from 1 to 3; and $X_3$ and $Y_3$ independently represent a hydrogen atom, a C1 to C4 alkyl group, a C1 to C4 alkoxy group, or halogen.

Specific examples of the compounds include:
1,1-diphenylmethyl octanoate,
1,1-diphenylmethyl nonanoate,
1,1-diphenylmethyl decanoate,
1,1-diphenylmethyl undecanoate,
1,1-diphenylmethyl dodecanoate,
1,1-diphenylmethyl tridecanoate,
1,1-diphenylmethyl tetradecanoate,
1,1-diphenylmethyl pentadecanoate,
1,1-diphenylmethyl hexadecanoate,
1,1-diphenylmethyl heptadecanoate, and
1,1-diphenylmethyl octadecanoate.

Further, in an embodiment, a compound expressed by the following general formula (4) may be used as the Component (C):

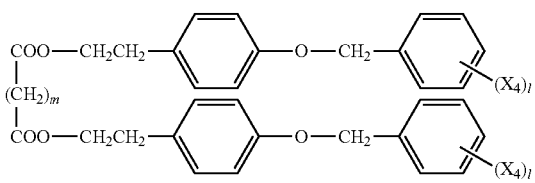

(4)

wherein each $X_4$ independently represents any one of a hydrogen atom, a C1 to C4 alkyl group, a methoxy group, or a halogen atom; each l independently represents an integer from 1 to 3; and m represents an integer from 1 to 20.

Examples of the compound include:
a diester of malonic acid and 2-[4-(4-chlorobenzyloxy) phenyl)]ethanol,
a diester of succinic acid and 2-(4-benzyloxyphenyl)ethanol,
a diester of succinic acid and 2-[4-(3-methylbenzyloxy) phenyl)]ethanol,
a diester of glutaric acid and 2-(4-benzyloxyphenyl)ethanol,
a diester of glutaric acid and 2-[4-(4-chlorobenzyloxy)phenyl)]ethanol,
a diester of adipic acid and 2-(4-benzyloxyphenyl)ethanol,
a diester of pimelic acid and 2-(4-benzyloxyphenyl)ethanol,
a diester of suberic acid and 2-(4-benzyloxyphenyl)ethanol,
a diester of suberic acid and 2-[4-(3-methylbenzyloxy)phenyl)]ethanol,
a diester of suberic acid and 2-[4-(4-chlorobenzyloxy)phenyl)]ethanol,
a diester of suberic acid and 2-[4-(2,4-dichlorobenzyloxy) phenyl)]ethanol,
a diester of azelaic acid and 2-(4-benzyloxyphenyl)ethanol,
a diester of sebacic acid and 2-(4-benzyloxyphenyl)ethanol,
a diester of 1,10-decanedicarboxylic acid and 2-(4-benzyloxyphenyl)ethanol,
a diester of 1,18-octadecanedicarboxylic acid and 2-(4-benzyloxyphenyl)ethanol, and
a diester of 1,18-octadecanedicarboxylic acid and 2-[4-(2-methylbenzyloxy)phenyl)]ethanol.

Further, in an embodiment, a compound expressed by the following general formula (5) may be used as the Component (C):

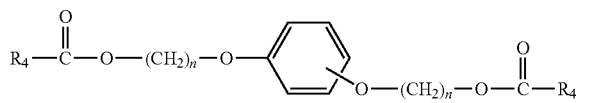

(5)

wherein, each $R_4$ independently represents a C1 to C21 alkyl or alkenyl group; and each n independent represents an integer from 1 to 3.

Examples of the compound include:
a diester of 1,3-bis(2-hydroxyethoxy)benzene and capric acid,
a diester of 1,3-bis(2-hydroxyethoxy)benzene and undecanoic acid
a diester of 1,3-bis(2-hydroxyethoxy)benzene and lauric acid,
a diester of 1,3-bis(2-hydroxyethoxy)benzene and myristic acid,
a diester of 1,4-bis(hydroxymethoxy)benzene and butyric acid,
a diester of 1,4-bis(hydroxymethoxy)benzene and isovaleric acid
a diester of 1,4-bis(2-hydroxyethoxy)benzene and acetic acid,
a diester of 1,4-bis(2-hydroxyethoxy)benzene and propionic acid
a diester of 1,4-bis(2-hydroxyethoxy)benzene and valeric acid,
a diester of 1,4-bis(2-hydroxyethoxy)benzene and caproic acid,
a diester of 1,4-bis(2-hydroxyethoxy)benzene and caprylic acid,
a diester of 1,4-bis(2-hydroxyethoxy)benzene and capric acid,
a diester of 1,4-bis(2-hydroxyethoxy)benzene and lauric acid, and
a diester of 1,4-bis(2-hydroxyethoxy)benzene and myristic acid.

Further, in an embodiment, a compound expressed by the following general formula (6) may be used as the Component (C):

(6)

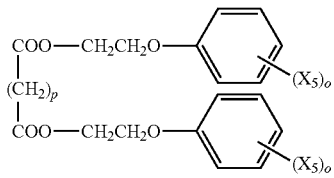

wherein each $X_5$ independently represents any one of a hydrogen atom, a C1 to C4 alkyl group, a C1 to C4 alkoxy group, and a halogen atom; each o independently represents an integer from 1 to 3; and p represents an integer from 1 to 20.

Examples of the compound include:
a diester of succinic acid and 2-phenoxyethanol,
a diester of suberic acid and 2-phenoxyethanol,
a diester of sebacic acid and 2-phenoxyethanol,
a diester of 1,10-decanedicarboxylic acid and 2-phenoxyethanol, and
a diester of 1,18-octadecanedicarboxylic acid and 2-phenoxyethanol.

Further, in an embodiment, a compound expressed by the following general formula (7) may be used as the Component (C):

(7)

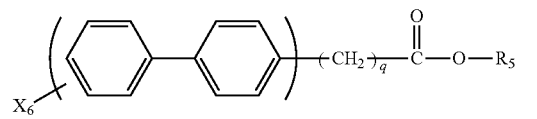

wherein $R_5$ represents any one of a C4 to C22 alkyl group, a cycloalkylalkyl group, a cycloalkyl group, and a C4 to C22 alkenyl group; $X_6$ represents any one of a hydrogen atom, a C1 to C4 alkyl group, a C1 to C4 alkoxy group, and a halogen atom; and q represents 0 or 1.

Examples of the compound include:
decyl 4-phenylbenzoate,
lauryl 4-phenylbenzoate,
myristyl 4-phenylbenzoate,
cyclohexylethyl 4-phenylbenzoate,
octyl 4-biphenylacetate,
nonyl 4-biphenylacetate,
decyl 4-biphenylacetate,
lauryl 4-biphenylacetate,
myristyl 4-biphenylacetate,
tridecyl 4-biphenylacetate,
pentadecyl 4-biphenylacetate,
cetyl 4-biphenylacetate,
cyclopentyl 4-biphenylacetate,
cyclohexylmethyl 4-biphenylacetate,
hexyl 4-biphenylacetate, and
cyclohexylmethyl 4-biphenylacetate Further, in an embodiment, a compound expressed by the following general formula (8) may be used as the Component (C):

(8)

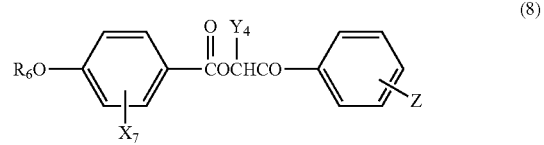

wherein $R_6$ represents a C3 to C7 alkyl group; $X_7$ represents any one of a hydrogen atom, a methyl group, and a halogen atom; $Y_4$ represents either of a hydrogen atom, or a methyl group; Z represents any one of a hydrogen atom, a C1 to C4 alkyl group, a C1 or C2 alkoxy group, and a halogen atom.

Examples of the compound include phenylethyl 4-butoxybenzoate, phenoxyethyl 4-butoxybenzoate, and phenoxyethyl 4-pentyloxybenzoate.

Figure 2:
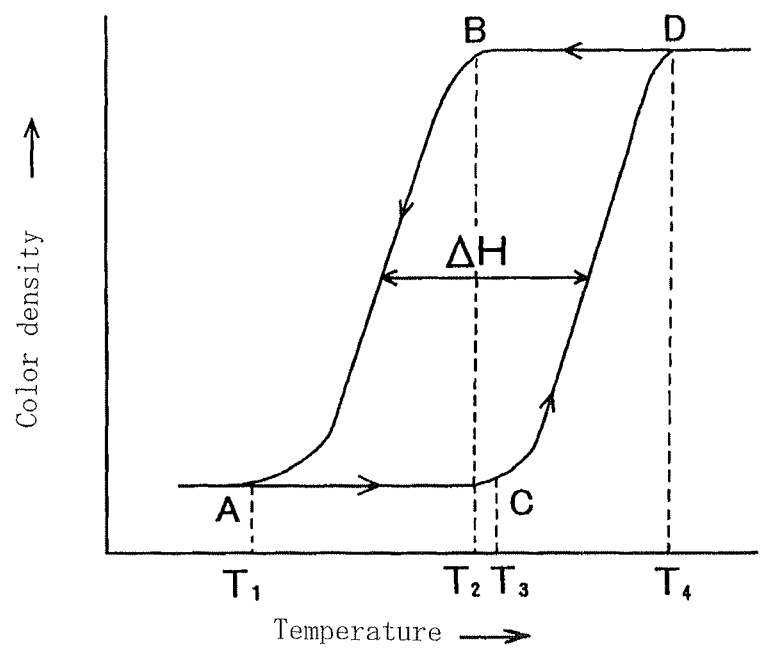
FIG. 2 is an explanatory diagram showing a color change behavior of a microencapsulated pigment containing a heat-decolorable reversibly thermochromic composition.

Further, in an embodiment, as an electron-accepting compound, a microencapsulated pigment encapsulating a heat-coloring type (a color is developed by heating and lost by cooling) reversibly thermochromic composition using a specific alkoxyphenol compound having a C3 to C18 straight chain or side chain alkyl group (Japanese Unexamined Patent Application Publication No. H11-129623, Japanese Unexamined Patent Application Publication No. H11-5973), a specific hydroxybenzoic ester (Japanese Unexamined Patent Application Publication No. 2001-105732), or a gallic ester (Japanese Examined Patent Application Publication No. S51-44706, Japanese Unexamined Patent Application Publication No. 2003-253149) may be applied (see FIG. 2).

The blending ratio of the Components (A), (B), and (C) would depend on density, color change temperature, color change form, or types of the respective components, however generally to obtain desired color change characteristics the relative content (in terms of part by mass) with respect to Component (A) as 1, for Component (B) is in a range of 0.1 to 50, preferably 0.5 to 20, and for Component (C) is in a range of 1 to 800, preferably 5 to 200. Each component may be a blend of 2 or more kinds.

(Medium)

As a medium for an ink for a reversibly thermochromic stamp according to the present invention, water is used, however if necessary a water-soluble organic solvent may be also used. Examples of the water-soluble organic solvent include ethanol, propanol, butanol, glycerine, sorbitol, triethanolamine, diethanolamine, monoethanol amine, ethylene glycol, diethylene glycol, thiodiethylene glycol, poly(ethylene glycol), propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, and N-methyl-2-pyrrolidone.

When a reversibly thermochromic microencapsulated pigment encapsulating a reversibly thermochromic composition composed of a Component (A): an electron-donating color-developing organic compound, and a Component (B): an electron-accepting compound, as well as a Component (C): a reaction medium causing reversibly an electron transfer reaction between the Component (A) and the Component (B) in a specific temperature range is used as a pigment, glycerine or propylene glycol is favorably used as a water-soluble organic solvent.

Further, examples of the medium include in addition to the above water-soluble organic solvents:

a castor oil-fatty acid alkyl ester compound;

a cellosolve solvent, such as methyl cellosolve, ethyl cellosolve, methyl cellosolve acetate, and ethyl cellosolve acetate;

an alkylene glycol solvent, such as ethylene glycol acetate, ethylene glycol diethyl ether, ethylene glycol monobutyl ether, diethylene glycol monoethyl ether, diethylene glycol monobutyl ether, diethylene glycol dimethyl ether, diethylene glycol monoethyl ether acetate, propylene glycol, propylene glycol monomethyl ether, propylene glycol monoethyl ether, propylene glycol monobutyl ether, propylene glycol monobutyl ether, propylene glycol monomethyl ether acetate, propylene glycol monoethyl ether acetate, propylene glycol monobutyl ether acetate, dipropylene glycol monomethyl ether, dipropylene glycol dimethyl ether, dipropylene glycol diethyl ether, dipropylene glycol monomethyl ether acetate, and tripropylene glycol monomethyl ether;

an ester solvent, such as ethyl formate, amyl formate, ethyl acetate, ethyl acetoacetate, propyl acetate, butyl acetate, 3-methyl-3-methoxybutyl acetate, amyl acetate, methyl-3-methoxypropionate, ethyl-3-methoxypropionate, ethyl-3-ethoxypropionate, propyl-3-methoxypropionate, butyl-3-methoxypropionate, methyl lactate, ethyl lactate, ethyl-2-hydroxy butyrate, butyl butyrate, butyl stearate, ethyl caprate, diethyl oxalate, ethyl pyruvate, and ethyl benzoate;

a hydrocarbon solvent, such as n-pentane, n-hexane, n-octane, n-dodecane, diisobutylene, dipentene, hexene, methylcyclohexene, bicyclohexyl, and mineral spirit;

a halogenated hydrocarbon solvent, such as amyl chloride, and butyl chloride;

an alcohol solvent, such as 3-methoxy-3-methylbutanol, and 3-methoxy-3-methylpentanol;

an ether solvent, such as diethyl ether, dipropyl ether, ethyl isobutyl ether, dibutyl ether, diisopropyl ether, diamyl ether, and dihexyl ether;

a ketone solvent, such as acetone, methyl ethyl ketone, methyl isopropyl ketone, methyl butyl ketone, methyl isobutyl ketone, methyl isoamyl ketone, ethyl amyl ketone, methyl hexyl ketone, methyl nonyl ketone, diisopropyl ketone, diisobutyl ketone, methoxymethyl pentanone, and cyclohexanone;

a propionic acid solvent, such as 3-methoxypropionic acid, and 3-ethoxypropionic acid; and a highly polar solvent, such as dimethyl formamide, dimethyl acetamide, dimethyl sulfoxide, N-methylpyrrolidone, and benzonitrile;

as well as a combined solvent thereof.

(Thickener)

Examples of a thickener include:

xanthan gum, welan gum, succinoglycan containing organic acid-modified heteropolysaccharides of glucose and galactose as a constituent monosaccharide (average molecular weight approx. 1 to 8 million), guar gum, locust bean gum and a derivative thereof, hydroxyethyl cellulose, an alginic acid alkyl ester, a polymer with a methacrylic acid alkyl ester as a main constituent having a molecular weight of 100,000 to 150,000, glycomannan, a thickening polysaccharide having gelling ability extracted from a seaweed, such as agar and carrageenan, benzylidene sorbitol, benzylidene xylitol, and a derivative thereof, a crosslinkable acrylic polymer, an inorganic fine particle, polyglycerol fatty acid ester, polyoxyethylene sorbitan fatty acid ester, poly(ethylene glycol) fatty acid ester, polyoxyethylene castor oil polyoxyethylene lanolin, lanolin alcohol, and a derivative of beeswax, a polyoxyethylene alkyl ether, a polyoxypropylene alkyl ether, a polyoxyethylene alkylphenyl ether, a nonionic surfactant with a HLB value of 8 to 12, such as a fatty acid amide, and a salt of a dialkyl or dialkenyl sulfosuccinic acid; which may be used singly or as a mixture.

In an embodiment, the thickener is preferably an alkali-soluble acrylic emulsion. When an alkali-soluble acrylic emulsion is used as the thickener, the pH of an ink composition is adjusted preferably to 6 to 11, more preferably to 7 to 11, and further preferably to 7 to 10.

(Binder Resin)

Examples of a binder resin include a resin emulsion, an alkali-soluble resin, and a water-soluble resin.

Examples of the resin emulsion include aqueous dispersions of polyacrylic ester, a styrene-acrylic acid copolymer, poly(vinyl acetate), an ethylene-vinyl acetate copolymer, an ethylene-vinyl chloride copolymer, a methacrylic acid-maleic acid copolymer, an ethylene-methacrylic acid copolymer, an α-olefin-maleic acid copolymer, polyester, and polyurethane. Examples of the alkali-soluble resin include a styrene-maleic acid copolymer, an ethylene-maleic acid copolymer, and a styrene-acrylic acid copolymer. Examples of the water-soluble resin include poly(vinyl alcohol), and poly(vinyl butyral). In this regard, a mixture of 2 or more kinds of the resin emulsions, alkali-soluble resins, and water-soluble resins may be used.

(pH Adjuster)

Examples of a pH adjuster include an inorganic salt, such as ammonia, sodium carbonate, sodium phosphate, sodium hydroxide, and sodium acetate; and a basic organic compound, for example, a water-soluble amine compound, such as triethanolamine and diethanolamine.

(Antiseptic Agent and Antifungal Agent)

Examples of an antiseptic agent or an antifungal agent include carbolic acid, a sodium salt of 1,2-benzisothiazolin-3-one, sodium benzoate, sodium dehydroacetate, potassium sorbate, propyl p-oxybenzoate, and 2,3,5,6-tetrachloro-4-(methylsulfonyl)pyridine.

(Others)

A fluorochemical surfactant, or a nonionic, anionic, and cationic surfactant, for improving the permeability of a solvent, and an antifoaming agent, such as dimethyl polysiloxane may be also added. Meanwhile, a nonthermochromic dye or pigment may be added in an ink composition, such that a thermochromic image is formed to interchange from a color (1) to a color (2) by a temperature change.

If necessary, a resin, such as an acrylic resin, a styrene-maleic acid copolymer, a cellulose derivative, poly(vinyl pyrrolidone), poly(vinyl alcohol), and dextrin, may be added to impart adhesiveness to a paper surface or viscosity.

Further, an anti-corrosive agent, such as benzotriazole, tolyltriazole, dicyclohexylammonium nitrite, diisopropylammonium nitrite, and saponin, a humectant, such as urea, a nonionic surfactant, an oligosaccharide, for example, a reduced or non-reduced starch hydrolysate, and trehalose, sucrose, cyclodextrin, glucose, dextrin, sorbit, mannite, and sodium pyrophosphate, an antifoaming agent, a dispersing agent, and a fluorochemical surfactant or a nonionic surfactant for improving the permeability of an ink, may be added.

(Stamp)

The ink composition for a reversibly thermochromic stamp may be use also as an ink composition for a stamp pad, and an ink composition for a stamp provided with a stamp material having continuous pores.

For example, a stamp pad for supplying an ink composition to a stamp face of a stamp, when the same is pressed to a stamp pad, may be obtained by impregnating an ink composition thereto. Further, a stamp can be obtained by impregnating an ink composition into a stamp material having continuous pores mounted on a stamp. As such a stamp material, that described below in detail in a section concerning a reversibly thermochromic stamp according to the 3rd embodiment may be also used.

As for a stamp provided with a stamp material having continuous pores, a stamp material such as a rubbery elastomer having continuous pores is impregnated with an ink composition. When the elastomer is pressed to a target surface, an ink composition is moved from the opening of a continuous pore to a target surface so that a surface shape of the stamp is transferred. A portion, where transfer is not desirable, is depressed, or the openings therein are subjected to a blocking treatment, so that an ink composition is prevented from sticking to a target surface. Examples of the surface shape of the stamp include a date, a symbol, and letters, such as "STRICTLY CONFIDENTIAL", "CONFIDENTIAL", "Finished", and "Received".

A stamp material having continuous pores is placed in a stamp main body, such that a stamp face is exposed, and the exposed surface is preferably provided with a cap, so as to avoid drying of an ink composition or staining due to an accidental contact during nonuse.

It may be so configured that an ink reservoir for supplying an ink composition to a stamp material is placed in a rear part of a stamp material having continuous pores so as to increase stamping cycles.

The stamp material is impregnated in advance with an ink composition and then mounted on a stamp, or alternatively a stamp material is mounted on a stamp and then the stamp material may be impregnated with an ink composition.

<An Ink Composition for a Reversibly Thermochromic Stamp According to the Second Embodiment>

An ink composition according to the second embodiment comprises, similarly as in the first embodiment, a reversibly thermochromic microencapsulated pigment encapsulating a reversibly thermochromic composition comprising Component (A), Component (B), and Component (C), water and a thickener, and may further contain various additives, such as a binder resin, an antioxidant, a UV absorber, an infrared light absorber, a solubilizing agent, a pH adjuster, an aseptic and antifungal agent, and a nonthermochromic dye or pigment.

An ink composition according to the second embodiment is characterized in that the ink composition viscosity is from 3,000 to 10,000 mPa·s, and the thixotropy is from 1.1 to 2.5.

The blending ratio of the reversibly thermochromic microencapsulated pigment with respect to the total amount of an ink composition is the same as the ink composition according to the first embodiment.

A reversibly thermochromic microencapsulated pigment encapsulating a reversibly thermochromic composition composed at least of the Component (A): an electron-donating color-developing organic compound, the Component (B): an electron-accepting compound, and the Component (C): a reaction medium causing reversibly an electron transfer reaction between the Component (A) and the Component (B) in a specific temperature range, will be described below.

(Reversibly Thermochromic Microencapsulated Pigment)

There is no particular restriction on the reversibly thermochromic microencapsulated pigment. Such a pigment is described, for example, in Japanese Examined Patent Application Publication No. S51-44706, Japanese Examined Patent Application Publication No. S51-44707, and Japanese Examined Patent Application Publication No. H1-29398. Specifically, it is a microencapsulated pigment that changes color above and below a predetermined temperature (color changing point), namely exhibits a decolored state in a temperature range not lower than an upper color changing point, and exhibits a colored state in a temperature range not higher than a lower color changing point. The microencapsulated pigment contains a reversibly thermochromic composition, namely a heat-decolorable composition (decolored when heated, and colored when cooled) characterized by a relatively narrow hysteresis width ($\Delta H=1$ to 7° C.), which maintains in a normal temperature range specifically one of the two states, while the other state is exhibited when high temperature or low temperature required for developing the state is being applied, and returns to the state to be exhibited in a normal temperature range, as soon as application of the high temperature or the low temperature is ceased (see FIG. 1).

Meanwhile, a reversibly thermochromic microencapsulated pigment containing a reversibly thermochromic composition to exhibit a relatively extensive hysteresis ($\Delta H_B=8$ to $50°$ C.) as described in Japanese Examined Patent Application Publication No. H4-17154, Japanese Unexamined Patent Application Publication No. H7-179777, Japanese Unexamined Patent Application Publication No. H7-33997, Japanese Unexamined Patent Application Publication No. H8-39936, etc. may be also applied. Such a pigment shows a hysteresis property as described for the first embodiment.

With respect to an ink composition for a reversibly thermochromic stamp according to the second embodiment, the completely decolored temperature ($t_4$) is preferably from 50 to $95°$ C., and the coloration initiation temperature ($t_2$) is preferably from $-50$ to $10°$ C.

When a stamp image is to be erased by friction, if the completely decolored temperature ($t_4$) is $95°$ C. or lower, the color of a stamp image formed on a surface to be stamped can be sufficiently changed by friction heat to be generated by rubbing its surface several times with a friction member.

If the completely decolored temperature ($t_4$) is a temperature beyond $95°$ C., the completely decolored temperature can be reached only with difficulty by a friction heat generated by friction with a friction member, and therefore color changes hardly occurs. To cope with the above there appears tendency that the number of friction cycles increases, or friction is attempted with an excessively high load, therefore a paper surface, if a surface to be stamped is paper, may be damaged.

In other words, the setup of the temperatures is an important requirement for visualizing alternatively a stamp image in a color-changed state on a surface to be stamped, through which convenience and practicality can be satisfied.

In order that the colored state can be maintained in an ordinarily storage environment, the completely decolored temperature ($t_4$) should preferably be relatively high. On the other hand, for decoloration by friction heat generated by friction, $t_4$ should preferably be relatively low. Considering the above circumstances, the completely decolored temperature ($t_4$) is preferably from 50 to $90°$ C., and more preferably from 60 to $80°$ C.

Further, with respect to the temperature setup of the coloration initiation temperature ($t_2$), in order that the decolored state is maintained during an ordinary usage state, a lower temperature is preferable. Namely, $-50$ to $5°$ C. is preferable, and $-50$ to $0°$ C. is more preferable. The hysteresis width ($\Delta H$) is preferably in a range of $50°$ C. to $100°$ C. according to the present invention, more preferably 55 to $90°$ C., and further preferably 60 to $80°$ C.

A microencapsulated pigment to be used for a reversibly thermochromic stamp according to the present invention may also use a reversibly thermochromic composition having the completely decolored temperature ($t_4$) at a temperature higher than the color change temperature range.

The average particle size of the reversibly thermochromic microencapsulated pigment, a method for microencapsulation of a reversibly thermochromic composition, and the mass ratio of a reversibly thermochromic composition to a microcapsule wall film are the same as the ink composition for a reversibly thermochromic stamp according to the first embodiment.

(Reversibly Thermochromic Composition)

A reversibly thermochromic composition is encapsulated by a microcapsule wall film and used as a reversibly thermochromic microencapsulated pigment. This is because the reversibly thermochromic composition can maintain the same composition and the same working-effect can be obtained under various operation conditions.

The components (A), (B) and (C) composing a reversibly thermochromic composition, and the blending ratio thereof are the same as the description with respect to an ink composition for a reversibly thermochromic stamp according to the first embodiment. Further, the kind or the content of other components, such as a medium, a thickener, a binder resin, a pH adjuster, an antiseptic agent, an antifungal agent, a surfactant, a nonthermochromic dye and pigment, and a viscosity improvement agent, may be the same as an ink composition for a reversibly thermochromic stamp according to the first embodiment.

(Stamp and Writing Tool)

An ink composition for a reversibly thermochromic stamp according to the second embodiment may be applied to a stamp or a writing tool similar to an ink composition for a reversibly thermochromic stamp according to the first embodiment.

<An Ink Composition for a Reversibly Thermochromic Stamp According to the Third Embodiment>

A reversibly thermochromic stamp according to the third embodiment is provided with a stamp material having continuous pores impregnated with an ink composition for a reversibly thermochromic stamp containing a reversibly thermochromic microencapsulated pigment encapsulating a reversibly thermochromic composition comprising:

Component (A): an electron-donating color-developing organic compound,

Component (B): an electron-accepting compound, and

Component (C): a reaction medium causing reversibly an electron transfer reaction between the Component (A) and the Component (B) in a specific temperature range, wherein:

the stamp material has an ink impregnating surface with pores to be impregnated with an ink, and an ink non-impregnating surface not to be impregnated with an ink, and P expressed by the following formula is 30 or higher, $$P=Sm^2/D^2$$

wherein Sm stands for an average distance of depressions and projections of the ink impregnating surface of the stamp material, and D stands for an average particle size of a microencapsulated pigment.

When P is less than 30, a stamp image may not be obtained, or thinning of a part of a stamp image may occur. P is preferably 90 or more, and more preferably 130 or more.

When P is 90 or more, a stamp image can be clear and sharp, and even if successive stamping is performed, a high quality stamp image can be obtained. Meanwhile, P is preferably 100,000 or less, and more preferably 30,000 or less.

The average particle size D of the reversibly thermochromic microencapsulated pigment is preferably from 0.1 µm to 10 µm. When the same is smaller than the range, bleed-through of an obtained stamp image from a paper surface tends to occur. Additionally, a stamp image loses its clearness, because as a colorant the color optical density is lowered. Further, stable retention of the microencapsulated pigment in an ink may become difficult, and the same may be apt to coagulate, which makes it difficult for an ink composition to flow in a continuous pore. As the result, a stamp image may become too thin, or successive stamping may become impossible.

When the value of D is higher than the above value range, an average distance of depressions and projections Sm of the ink impregnating surface of a stamp material is required to be large in order to satisfy the formula. As the result continuous pores become too coarse and a stamp image loses its sharpness to some extent and the resolution tends to become poorer. D is preferably from 0.1 μm to 7 μm, and further preferably from 0.3 μm to 5 μm. In the range, a stamp image may be clear and sharp, and even by successive stamping a high quality stamp image may be obtained.

A reversibly thermochromic stamp according to the present invention can form a stamp image on various surfaces to be stamped. The stamp image can be made to change a color by rubbing with a finger or application of a heating device or a cooling device.

(Stamp Material)

The average distance of depressions and projections of the ink impregnating surface Sm of a stamp material for a reversibly thermochromic stamp according to the present invention is preferably 30 μm or less. The Sm is preferably 10 μm or more. When Sm is less than 10 μm, an ink may be hardly discharged from an ink impregnating surface of a stamp material depending on the average particle size of a microencapsulated pigment. Meanwhile, when Sm is larger than 30 μm, a continuous pore becomes so large that the edge of a stamp image loses sharpness to some extent, and the resolution tends to become poorer. Further, with some inks, a stamp image tends to blur.

Although an average distance of depressions and projections of the ink impregnating surface Sm is a value obtained by observing a stamp face, there is a correlation between the value and the pore size of a continuous pore, and a status of a continuous pore discharging an ink can be deduced by determining the Sm. In this regard, an average distance of depressions and projections of the ink impregnating surface Sm may be measured by a method according to JIS B0601-1994.

Since a reversibly thermochromic stamp according to the present invention is provided with an ink impregnating surface and an ink non-impregnating surface, a stamp face able to form a stamp image can be obtained. An ink non-impregnating surface means hereunder a part of a stamp material, from which an ink composition is not transferred to a surface to be stamped.

Examples of a method for forming an ink non-impregnating surface include (1) a method to form a recessed part, from which an ink is not transferred to a surface to be stamped, on a stamp face, (2) a method to close continuous pores on an ink impregnating surface by a heat treatment, etc., and (3) a method to close continuous pores on an ink impregnating surface by a heat treatment, etc. Among them, the method to close continuous pores on an ink impregnating surface by a heat treatment, etc. is a simple method and used preferably.

The surface roughness Ra of an ink non-impregnating surface is preferably 2 μm or less. It is preferable that the surface roughness is 2 μm or less, because ink leakage does not occur from an ink non-impregnating surface, and a stamp image is not fouled, even when an ink non-impregnating surface is provided by forming a recessed part on a stamp face.

Although the surface roughness Ra of an ink non-impregnating surface is a value obtained by observing a surface status of an ink non-impregnating surface, a status of closure of continuous pores can be deduced by the value.

The status of a stamp face is decided by the Sm and Ra, and if Sm is large, there is a risk that continuous pores may not be closed sufficiently. Also from this, Sm is preferably 30 μm or less.

Observation of a stamp face used according to the present invention is carried out using a scanning probe microscope (SPI3800N, produced by Seiko Epson Corporation) to find an average distance of depressions and projections of an ink impregnating surface Sm, and the Ra of an ink non-impregnating surface.

There is no particular restriction on the stamp material, insofar as it has continuous pores, and a rubbery elastomer, or a material having continuous pores called generally as sponge or foam may be used. Specific examples include polyethylene, polypropylene, polybutylene, polyurethane, polystyrene, poly(vinyl chloride), polyester, polycarbonate, a polyethylene-based thermoplastic elastomer, a polypropylene-based thermoplastic elastomer, a polybutylene-based thermoplastic elastomer, a polyurethane-based thermoplastic elastomer, a polystyrene-based thermoplastic elastomer, a polydiene-based thermoplastic elastomer, a polychloride-based thermoplastic elastomer, and an ethylene-vinyl acetate copolymer resin.

Since the stamp material is impregnated with an ink composition, when the same is pressed to a surface to be stamped, an ink composition is transferred from an ink impregnating surface to a surface to be stamped to form a stamp image. Meanwhile, a reversibly thermochromic stamp according to the present invention is placed in a stamp main body, such that a stamp face is exposed, and the exposed surface is preferably provided with a cap, so as to avoid drying of an ink composition or staining due to an accidental contact during nonuse. Further, it may be so configured that an ink reservoir for supplying an ink composition to a stamp material is placed in a rear part of a stamp material having continuous pores so as to increase stamping cycles.

The reversibly thermochromic stamp (1) may be produced by impregnating an ink for a reversibly thermochromic stamp into a stamp material having continuous pores, fixing the material to a stamp main body (3) such that a stamp face is exposed, and putting a tail plug (4) and a cap (5) on. In this regard, a friction member as a tail plug (4) may be placed at the rear end of the stamp main body (3).

As another production method, the reversibly thermochromic stamp (1) may be produced by fixing the stamp material having continuous pores (2) to a stamp main body (3) such that a stamp face is exposed, then impregnating an ink for a reversibly thermochromic stamp thereto, and putting a tail plug (4) and a cap (5) on. Identically with the aforedescribed production method, a friction member as a tail plug (4) may be placed at the rear end of the stamp main body (3). Further, in impregnating an ink to the stamp material, it may be impregnated to the stamp material by injection from the side opposite to the stamp face.

Examples of the heating device for changing the color of a stamp image include an electrically heated color changing device using a thermal head, a heating roller, or a hot stamp provided with a resistance heating element such as a PTC element; a heated color changing device filled with a medium such as hot water; a heated color changing device using steam or laser light, and a blow dryer. A friction member is preferably used as a simple and eligible means for color changing.

As the friction member, an elastomer and an elastic body such as a plastic foam, which are rich in elastical feeling, and generate friction heat by appropriate friction caused during rubbing, are appropriate. As the material for the friction member, a silicone resin, a SEBS resin (a styrene ethylene butylene styrene block copolymer), a polyester resin, a polyester elastomer, etc. are used. With respect to the friction member, a friction body as an independent component with an optional shape and a stamp may be combined to constitute a stamp set, however by attaching a friction member to a stamp, the portability can be made excellent.

As a heated color changing device for a reversibly thermochromic stamp using a reversibly thermochromic composition, in which the completely decolored temperature ($t_4$) is on the side of temperature of 80° C. or higher, an electrically heated color changing device using a thermal head, a heating roller, or a hot stamp provided with a resistance heating element such as a PTC element; a heated color changing device filled with a medium such as hot water; a heated color changing device using steam or laser light, and a blow dryer may be used favorably.

Examples of the cooling device include a cooled color changing device utilizing a Peltier device, and a cooled color changing device filled with a coolant, such as cold water, and ice chip, as well as a refrigerant, a refrigerator, and a freezer.

(Ink Composition for a Reversibly Thermochromic Stamp)

As an ink composition to be impregnated into a stamp material included in a reversibly thermochromic stamp, there is no particular restriction, insofar as it contains a reversibly thermochromic microencapsulated pigment encapsulating a reversibly thermochromic composition comprising:

Component (A): an electron-donating color-developing organic compound,

Component (B): an electron-accepting compound, and

Component (C): a reaction medium causing reversibly an electron transfer reaction between the Component (A) and the Component (B) in a specific temperature range, and the microencapsulated pigment has an average particle size satisfying the above formula. Ink compositions according to the first embodiment and the second embodiment, etc. may be used.

(Stamp Set)

Combining the stamp and a writing tool accommodating an ink composition containing a colorant, which is decolored by heating, in a shaft and being provided with a pen nib at the frontal writing tip, a stamp set may be prepared, or by combining the stamp and the color changing device a stamp set may be also prepared. As a colorant to be contained in the ink composition of a writing tool, a reversibly thermochromic microencapsulated pigment similar to the above may be used.

(Writing Tool)

Examples of a writing tool composing a stamp set include a marking pen and ballpoint pen having a marking pen tip or a ballpoint pen tip at the frontal writing tip.

An ink composition may be a shear-rate thinning ink composition containing a shear-rate thinning agent, or a coagulated ink composition having suspended microencapsulated pigments into a loosely coagulated state by a water soluble polymer flocculant. It may be also an ink composition, in which the specific gravity difference between a microencapsulated pigment and a vehicle is regulated to 0.05 or less. By adding a shear-rate thinning agent, coagulation, or sedimentation of a microencapsulated pigment can be suppressed, and blurring of a script can be also suppressed, so that excellent script can be formed. Further, when a writing tool filled with the ink composition is a form of a ballpoint pen, ink leakage through a gap between a ball and a tip during nonuse can be prevented, and when the tool is left to stand with the frontal writing tip upward (upright status), backflow of the ink can be prevented.

In an embodiment, an ink composition may contain a lubricant. Examples of the shear-rate thinning agent include:
xanthan gum,
welan gum,
succinoglycan, namely an organic acid-modified heteropolysaccharide of glucose and galactose as a constituent monosaccharide (average molecular weight approx. 1 to 8 million),
guar gum,
locust bean gum and a derivative thereof,
hydroxyethyl cellulose,
an alginic acid alkyl ester compound,
a polymer having a molecular weight of 100,000 to 150,000 with an alkyl ester of methacrylic acid as a main component,
glucomannan: thickening polysaccharide having gelling ability extracted from a seaweed, such as agar and carrageenin, benzylidene sorbitol, and benzylidene xylitol, or a derivative thereof,
a crosslinkable acrylic polymer,
an inorganic fine particle,
polyglycerol esters of fatty acids,
polyoxyethylene sorbitan fatty acid ester,
poly(ethylene glycol) fatty acid ester,
polyoxyethylene alkyl ether,
polyoxypropylene alkyl ether,
polyoxyethylene alkylphenyl ether,
a nonionic surfactant having a HLB value of 8 to 12, such as a fatty acid amide,
a salt of a dialkyl or dialkenyl sulfosuccinic acid,
a mixture of a N-alkyl-2-pyrrolidone and an anionic surfactant, and
a mixture of poly(vinyl alcohol) and an acrylic resin.

Examples of a water soluble polymer flocculant include polyvinylpyrrolidone, poly(ethylene oxide), a water-soluble polysaccharide, and a water-soluble cellulose derivative. Specific examples of a water-soluble polysaccharide include tragacanth gum, guar gum, pullulan, and cyclodextrin. Specific examples of a water-soluble cellulose derivative include methyl cellulose, hydroxyethyl cellulose, hydroxypropyl cellulose, hydroxyethyl methyl cellulose, and hydroxypropyl methyl cellulose. Any water soluble polymer flocculant, which exerts loose crosslinking action between pigment particles, can be applied to an ink composition, and among them a water-soluble cellulose derivative is preferable, because it works most effectively. A polymer flocculant is preferably added at 0.05 to 20 mass % with respect to the total amount of an ink composition.

In a case where the ink composition is filled in a ballpoint pen, it is preferable to add a lubricant, including a higher fatty acid, such as oleic acid; a nonionic surfactant having a long-chain alkyl group; a polyether-modified silicone oil; a thiophosphorous acid triester, such as a thiophosphorous acid tri(alkoxycarbonylmethyl ester), and a thiophosphorous acid tri(alkoxycarbonylethyl ester); a phosphoric monoester of a polyoxyethylene alkyl ether or a polyoxyethylene alkylaryl ether; a phosphoric diester of a polyoxyethylene alkyl ether or a polyoxyethylene alkylaryl ether; or a metal salt, an ammonium salt, an amine salt, an alkanolamine salt of the above; so as to prevent a ball seat from wearing.

There is no particular restriction on the structure or the shape of a ballpoint pen itself. For example, a ballpoint pen in which an ink reservoir tube filled with a shear-rate thinning ink is in a shaft, the ink reservoir tube communicates with a tip retaining a ball at the frontal end, and a liquid stopper for preventing backflow is placed tight to an end face of the ink, can be illustrated.

The ballpoint pen tip will be described in more detail. As a ballpoint pen tip, for example, (1) a tip retaining a ball in a ball retainer prepared by pressing a frontal rim of a metal tube to deform inward from the outside, (2) a tip retaining a ball in a ball retainer prepared by cutting a metal material with a drill, etc., (3) a tip provided with a resin-made ball seat inside a metallic or plastic tip, or (4) a tip, in which a ball retained in the tip is pressed frontward by a spring body, may be applied.

The ball may be made of cemented carbide, stainless steel, ruby, ceramic, resin, rubber, etc., and the applicable diameter is preferably from 0.3 nm to 3.0 mm, more preferably from 0.3 nm to 1.5 mm, and further preferably approx. from 0.4 nm to 1.0 mm.

As the ink reservoir tube for accommodating an ink, for example, a formed body made of a thermoplastic resin, such as polyethylene, polypropylene, polyethylene terephthalate, and nylon, or a metal is used.

The ink reservoir tube may be directly connected with the tip, or the ink reservoir tube and the tip may be connected through the intermediary of a connecting member (holder). The ink reservoir tube may be in a form of refill, and the refill may be placed in a resin-made, or metal-made shaft; or a shaft itself having a tip at the frontal end may function as an ink reservoir into which an ink may directly filled.

At the back end of an ink accommodated in the ink reservoir tube, an ink backflow preventer is preferably filled. The ink backflow preventer composition is preferably composed of a nonvolatile liquid or a hardly volatile liquid. Further, a combination of a liquid ink backflow preventer and a solid ink backflow preventer may be also used.

Specific examples thereof include vaseline, spindle oil, castor oil, olive oil, purified mineral oil, liquid paraffin, polybutene, α-olefin, an oligomer or a co-oligomer of α-olefin, dimethyl silicone oil, methyl phenyl silicone oil, amino-modified silicone oil, polyether-modified silicone oil, and fatty acid-modified silicone oil; and one kind or two or more kinds in combination may be used.

The viscosity of the nonvolatile liquid and/or the hardly volatile liquid should preferably be increased to an appropriate viscosity by adding a thickener. Examples of a thickener include a clay-based thickener, such as silica with a hydrophobized surface, particulate silica with a methylated surface, aluminum silicate, swelling mica, and bentonite or montmorillonite subjected to a hydrophobization treatment; a fatty acid metal salt, such as magnesium stearate, calcium stearate, aluminum stearate, and zinc stearate; tribenzylidene sorbitol, fatty acid amide, amide-modified polyethylene wax, hydrogenated castor oil, a dextrin-based compound, such as fatty acid dextrin; and a cellulose-based compound.

When the ink composition is filled in a marking pen, there is no particular restriction on the structure, or shape of a marking pen itself A marking pen, in which an ink absorber constituted with a fiber bundle is placed in a shaft, a marking pen tip constituted with a processed fiber product with capillary gaps formed is directly or through the intermediary of a connecting member (holder) affixed to the shaft, and a coagulating ink is impregnated into the ink absorber of the marking pen having the connected ink absorber and tip; or a marking pen, in which a tip and an ink reservoir tube are placed through the intermediary of a valve body to be opened when the pen tip is pushed, and an ink is directly stored in the ink reservoir tube, can be illustrated.

The tip is preferably a heretofore broadly utilized porous member with open pores having a porosity selected from a range of approx. 30 to 70%, such as a resin-treated fiber product, a fused heat-melting fiber product, and a felt body, and put into practice after processing an end to a shape, such as cannon shell shape, rectangular shape, and chisel shape, according to the purpose.

The ink absorber is ordinarily crimped fibers bundled along a longitudinal direction, and placed inside a covering, such as a plastic cylinder, or a film, and is so configured that the porosity thereof is regulated in a range of approx. 40 to 90%.

The valve body in a pumping form which has been used so far may be used, a spring pressure is preferably set to be openable by writing pressure.

Further, the shape of a writing tool is not limited to those described above, and it may be a complex writing tool, to which tips with different shapes, or tips dispensing inks of different colors are mounted (double-headed type, telescopic pen tips type, etc.).

In the case of the combination of a stamp and a writing tool, microencapsulated pigments having more or less similar color change temperature ranges may be combined, or a microencapsulated pigment to be used for a stamp having a color change temperature range on a higher temperature side may be combined.

EXAMPLES

Examples are described below, provided that the present invention be not limited thereto.

"Parts" in Examples mean parts by mass.

Example 1-1

Production of Reversibly Thermochromic Microencapsulated Pigment 1A

A reversibly thermochromic composition having color memory, composed of as Component (A) 1 part of 3-(2-ethoxy-4-diethylaminophenyl)-3-(1-ethyl-2-methylindol-3-yl)-4-azaphthalide, as Component (B) 5 parts of 2,2-bis(4-hydroxyphenyl)hexafluoropropane, and as Component (C) 50 parts of a diester compound of adipic acid and 2-(4-benzyloxyphenyl)ethanol was dissolved by heating, and as a wall material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a reversibly thermochromic microcapsule suspension. The yielded suspension was centrifuged to isolate a reversibly thermochromic microencapsulated pigment 1A.

The average particle size of the microencapsulated pigment 1A was 2.5 μm, and the mass ratio of the reversibly thermochromic composition to the microcapsule wall film was 2.6:1.0. Further, a hysteresis property of $t_1$: 4° C., $t_2$: 14° C., $t_3$: 77° C., $t_4$: 85° C., ΔH: 72° C. was exhibited, and the color changed from blue to colorless, and colorless to blue reversibly.

Preparation of Ink Composition for Reversibly Thermochromic Stamp

Then, 20.0 parts of the microencapsulated pigment 1A (cooled in advance to 4° C. or lower to develop a blue color), 50.0 parts of glycerine, 1.5 parts of an alkali-soluble acrylic emulsion (Trade name: PRIMAL DR73, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 16.7 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 4,700 mPa·s, and the ink viscosity measured at 60 rpm was 2,400 mPa·s, and the thixotropy (ink viscosity measured at 6 rpm/ink viscosity measured at 60 rpm) was 1.95. The pH at 25° C. was 8.7.

Figure 3:
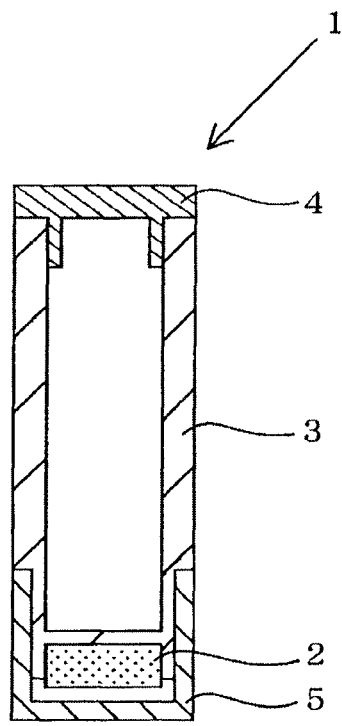
FIG. 3 is an explanatory longitudinal cross-sectional view showing an Example of stamp containing an ink composition for a reversibly thermochromic stamp.

Production of Stamp (See FIG. 3)

A stamp was obtained by impregnating the ink composition into a stamp material 2 having continuous pores, fixing the same to a stamp main body 3 to expose a stamp face of the stamp material, and putting a tail plug 4 and a cap 5 on.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by heating with an electrically heated color changing device provided with a resistance heating element and a heating roller, and this state could be maintained at room temperature.

When the decolored paper sheet was placed in a freezer to be chilled to a temperature of 4° C. or lower, the stamp image exhibited a color change behavior to return to a blue color, and this behavior could be reproduced repeatedly.

Example 1-2

Production of Reversibly Thermochromic Microencapsulated Pigment 1B

A reversibly thermochromic composition having color memory, composed of as Component (A) 1 part of 3-(2-ethoxy-4-diethylaminophenyl)-3-(1-ethyl-2-methylindol-3-yl)-4-azaphthalide, as Component (B) 5 parts of 2,2-bis(4-hydroxyphenyl)hexafluoropropane, and as Component (C) 50 parts of a diester compound of 1,4-bis(2-hydroxyethoxy)benzene and caproic acid was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a reversibly thermochromic microcapsule suspension. The yielded suspension was centrifuged to isolate a reversibly thermochromic microencapsulated pigment 1B.

The average particle size of the microencapsulated pigment 1B was 2.3 μm, and the mass ratio of the reversibly thermochromic composition to the microcapsule wall film was 2.6:1.0. Further, a hysteresis property of $t_1$: −4° C., $t_2$: 4° C., $t_3$: 62° C., $t_4$: 82° C., ΔH: 72° C. was exhibited, and the color changed from blue to colorless, and colorless to blue reversibly.

Preparation of Ink Composition for Reversibly Thermochromic Stamp

Then, 18.0 parts of the microencapsulated pigment 1B (cooled in advance to −4° C. or lower to develop a blue color), 50.0 parts of glycerine, 3.3 parts of an alkali-soluble acrylic emulsion (Trade name: PRIMAL TT935, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 16.9 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 4,000 mPa·s, and the ink viscosity measured at 60 rpm was 3,000 mPa·s, and the thixotropy (ink viscosity measured at 6 rpm/ink viscosity measured at 60 rpm) was 1.33. The pH at 25° C. was 8.0.

Figure 4:
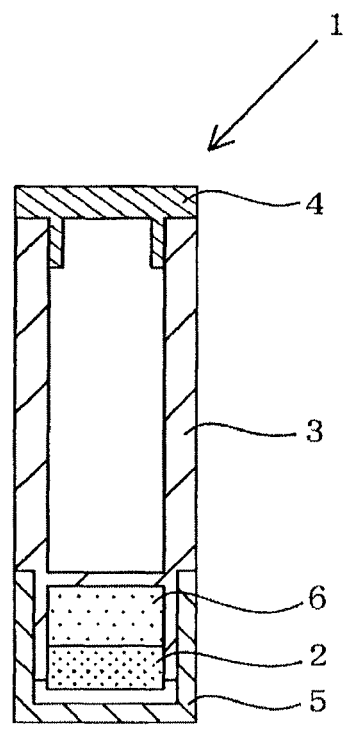
FIG. 4 is an explanatory longitudinal cross-sectional view showing another Example of stamp containing an ink composition for a reversibly thermochromic stamp.

Production of Stamp (See FIG. 4)

A stamp was obtained by impregnating the ink composition into a stamp material 2 having continuous pores, and a reservoir 6 having continuous pores and a porosity higher than the stamp material, placing the reservoir 6 in a stamp main body 3, installing the stamp material 3 in contact with the reservoir, and putting a tail plug 4 and a cap 5 on.

When the stamp was pressed repeatedly to a target surface (paper), the ink composition was dispensed smoothly from a stamp face of the stamp material and transferred to the target surface, so that clear stamp images could be more successively formed without blurring of the stamp image.

The stamp image was decolored to a colorless state by heating with an electrically heated color changing device provided with a resistance heating element and a heating roller, and this state could be maintained at room temperature.

When the decolored paper sheet was placed in a freezer to chill to a temperature of −4° C. or lower, the stamp image exhibited a color change behavior to return to a blue color, and this behavior could be reproduced repeatedly.

Example 1-3

Production of Reversibly Thermochromic Microencapsulated Pigment 1C

A reversibly thermochromic composition having color memory, composed of as Component (A) 1 part of 2-(2-chloroanilino)-6-di-n-butylaminofluoran, as Component (B) 3 parts of 2,2-bis(4-hydroxyphenyl)hexafluoropropane and 3 parts of 1,1-bis(4-hydroxyphenyl)-n-decane, and as Component (C) 50 parts of a diester of 1,4-bis(2-hydroxyethoxy)benzene and caproic acid was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a reversibly thermochromic microcapsule suspension. The yielded suspension was centrifuged to isolate a reversibly thermochromic microencapsulated pigment 1C.

The average particle size of the microencapsulated pigment 1C was 1.8 μm, and the mass ratio of the reversibly thermochromic composition to the microcapsule wall film was 2.6:1.0. Further, a hysteresis property of $t_1$: −7° C., $t_2$: 1° C., $t_3$: 58° C., $t_4$: 80° C., ΔH: 72° C. was exhibited, and the color changed from pink to colorless, and colorless to pink reversibly.

Preparation of Ink Composition for Reversibly Thermochromic Stamp

Then, 16.0 parts of the microencapsulated pigment 1C (cooled in advance to −7° C. or lower to develop a pink color), 50.0 parts of glycerine, 4.4 parts of an alkali-soluble acrylic emulsion (Trade name: PRIMAL TT935, Rohm and Haas Japan K.K.), 0.9 part of triethanolamine, 10.0 parts of a 50% aqueous solution of poly(vinylpyrrolidone), 0.2 part of a silicon antifoaming agent, 0.5 part of a penetration leveling agent, 0.2 part of an antiseptic agent, and 17.8 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 8,000 mPa·s, and the ink viscosity measured at 60 rpm was 6,600 mPa·s, and the thixotropy (ink viscosity measured at 6 rpm/ink viscosity measured at 60 rpm) was 1.21. The pH at 25° C. was 7.6.

Figure 5:
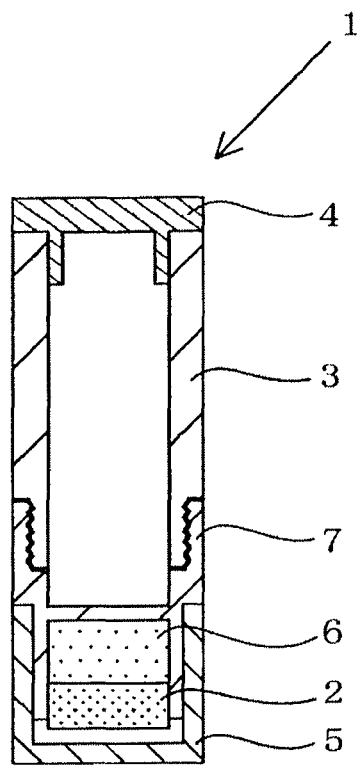
FIG. 5 is an explanatory longitudinal cross-sectional view showing another Example of stamp containing an ink composition for a reversibly thermochromic stamp.

Production of Stamp (See FIG. 5)

A stamp was obtained by impregnating the ink composition into a stamp material 2 having continuous pores, and a reservoir 6 having continuous pores and a porosity higher than the stamp material, placing the reservoir in a replaceable unit 7, fixing the stamp material in contact with the reservoir, screwing together the replaceable unit and the stamp main body 3, and putting a tail plug 4 and a cap 5 on.

When the stamp was pressed repeatedly to a target surface (paper), the ink composition was dispensed smoothly from a stamp face of the stamp material and transferred to the target surface, so that clear stamp images could be more successively formed without blurring of the stamp image.

The stamp image was decolored to a colorless state by heating with an electrically heated color changing device provided with a resistance heating element and a heating roller, and this state could be maintained at room temperature.

When the decolored paper sheet was placed in a freezer to chill to a temperature of −7° C. or lower, the stamp image exhibited a color change behavior to return to a pink color, and this behavior could be reproduced repeatedly.

With respect to the above stamp, a plurality of new replaceable units could be mounted after removing a replaceable unit from the stamp main body, and put to a practical use.

As for such new replaceable units, a replaceable unit containing the same ink and having the same stamp material, a replaceable unit containing an ink of a different color, and having the same stamp material, a replaceable unit containing the same ink and having a stamp material with an different image, and a replaceable unit containing an ink of a different color, and having a stamp material with an different image were prepared.

Example 1-4

Production of Reversibly Thermochromic Microencapsulated Pigment 1D

A reversibly thermochromic composition having color memory, composed of as Component (A) 1 part of 3-(2-ethoxy-4-diethylaminophenyl)-3-(1-ethyl-2-methylindol-3-yl)-4-azaphthalide, as Component (B) 5 parts of 2,2-bis(4-hydroxyphenyl)hexafluoropropane, and as Component (C) 50 parts of a diester compound of succinic acid and 2-phenoxyethanol was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a reversibly thermochromic microcapsule suspension. The yielded suspension was centrifuged to isolate a reversibly thermochromic microencapsulated pigment 1D.

The average particle size of the microencapsulated pigment was 2.5 µm, and the mass ratio of the reversibly thermochromic composition to the microcapsule wall film was 2.6:1.0. Further, a hysteresis property of $t_1$: 6° C., $t_2$: 8° C., $t_3$: 92° C., $t_4$: 106° C., ΔH: 92° C. was exhibited, and the color changed from blue to colorless, and colorless to blue reversibly.

Preparation of Ink Composition for Reversibly Thermochromic Stamp

Then, 20.0 parts of the microencapsulated pigment 1D (cooled in advance to 6° C. or lower to develop a blue color), 50.0 parts of glycerine, 1.6 parts of an alkali-soluble acrylic emulsion (Trade name: PRIMAL TT935, Rohm and Haas Japan K.K.), 0.8 part of an alkali-soluble acrylic emulsion (Trade name: PRIMAL DR73, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 15.8 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 5,500 mPa·s, and the ink viscosity measured at 60 rpm was 3,550 mPa·s, and the thixotropy (ink viscosity measured at 6 rpm/ink viscosity measured at 60 rpm) was 1.55. The pH at 25° C. was 8.3.

Production of Stamp

A stamp was obtained by impregnating the ink composition into a stamp material having continuous pores, fixing the same to a stamp main body to expose a stamp face of the stamp material, and putting a tail plug and a cap on.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by heating with an electrically heated color changing device provided with a resistance heating element and a heating roller, and this state could be maintained at room temperature.

When the decolored paper sheet was placed in a freezer to chill to a temperature of 6° C. or lower, the stamp image exhibited a color change behavior to return to a blue color, and this behavior could be reproduced repeatedly.

Example 1-5

Preparation of Ink Composition for Reversibly Thermochromic Stamp

Firstly, 18.0 parts of the microencapsulated pigment 1D (cooled in advance to 6° C. or lower to develop a blue color), 50.0 parts of glycerine, 5.5 parts of an alkali-soluble acrylic emulsion (Trade name: PRIMAL TT935, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 14.7 parts of water were mixed to yield an ink composition for a reversibly thermochromic stamp.

The ink viscosity of the yielded ink composition for a reversibly thermochromic stamp was measured at 25° C.

with a BL-type viscometer. The ink viscosity measured at 6 rpm was 10,000 mPa·s, and the ink viscosity measured at 60 rpm was 9,000 mPa·s, and the thixotropy (ink viscosity measured at 6 rpm/ink viscosity measured at 60 rpm) was 1.11. The pH at 25° C. was 7.2.

Production of Stamp

A stamp comprising a stamp main body, which accommodated a reservoir having continuous pores and a porosity higher than a stamp material having continuous pores, and fixed the stamp material in contact with the reservoir, wherein the ink composition was impregnated in the stamp material and the reservoir; a sheath, which was placed around the stamp main body slidably with respect to the stamp main body, such that the lower edge thereof was positioned below the stamp face of the stamp material by a resilient force during nonuse; and a pair of shutter members, which were placed in the sheath to cover the stamp material during nonuse, was obtained.

When the stamp was pressed repeatedly to a target surface (paper), the ink composition was dispensed smoothly from a stamp face of the stamp material and transferred to the target surface, so that clear stamp images could be more successively formed without blurring of the stamp image.

The stamp image was decolored to a colorless state by heating with an electrically heated color changing device provided with a resistance heating element and a heating roller, and this state could be maintained at room temperature.

When the decolored paper sheet was placed in a freezer to chill to a temperature of 6° C. or lower, the stamp image exhibited a color change behavior to return to a blue color, and this behavior could be reproduced repeatedly.

Example 1-6

Preparation of Ink Composition for Reversibly Thermochromic Stamp

Firstly, 25.0 parts of the microencapsulated pigment 1D prepared in Example 1-5 (cooled in advance to 6° C. or lower to develop a blue color), 50.0 parts of glycerine, 1.1 parts of an alkali-soluble acrylic emulsion (Trade name: PRIMAL DR73, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 12.1 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 3,000 mPa·s, and the ink viscosity measured at 60 rpm was 1,500 mPa·s, and the thixotropy (ink viscosity measured at 6 rpm/ink viscosity measured at 60 rpm) was 2.0. The pH at 25° C. was 8.9.

Production of Stamp

The ink composition was impregnated in a belt-formed stamp material for a rotary stamp, having continuous pores and a stamp face composed of numerals 0 to 9.

A stamp was obtained by incorporating the stamp material into a rotary stamp.

When the stamp was pressed repeatedly to a target surface (paper), the ink composition was dispensed smoothly from a stamp face of the stamp material and transferred to the target surface, so that clear stamp images could be more successively formed without blurring of the stamp image.

The stamp image was decolored to a colorless state by heating with an electrically heated color changing device provided with a resistance heating element and a heating roller, and this state could be maintained at room temperature.

When the decolored paper sheet was placed in a freezer to be chilled to a temperature of 6° C. or lower, the stamp image exhibited a color change behavior to return to a blue color, and this behavior could be reproduced repeatedly.

Example 1-7

Production of Stamp

A stamp was obtained by impregnating the ink composition prepared in Example 1-4 into a stamp material having continuous pores, fixing the same to a stamp main body to expose a stamp face of the stamp material, and putting a tail plug and a cap on.

In the surroundings of the stamp material, a guide piece, which moved up and down longitudinally during stamping by a spring mechanism, was provided, such that the guide piece came into contact with a target surface (paper) and as the consequence the stamp material came into contact with a target surface uniformly.

Production of Reversibly Thermochromic Microencapsulated Pigment 1E

A reversibly thermochromic composition having color memory, composed of as Component (A) 2.0 parts of 3-(4-diethylamino-2-hexyloxyphenyl)-3-(1-ethyl-2-methylindol-3-yl)-4-azaphthalide, Component (B) 4.0 parts of 1,1-bis(4'-hydroxyphenyl)hexafluoropropane, and 4.0 parts of 1,1-bis(4'-hydroxyphenyl)-n-decane, and as Component (C) 50.0 parts of 4-benzyloxyphenylethyl caprate was dissolved by heating, and as a wall film material 30.0 parts of an aromatic isocyanate prepolymer, and 40.0 parts of a co-solvent were mixed therewith. The mixture solution was emulsified in a 8% poly(vinyl alcohol) aqueous solution, stirred with heating, then after addition of 2.5 parts of a water-soluble aliphatic-modified amine, further stirred to yield a reversibly thermochromic microcapsule suspension. The yielded suspension was centrifuged to isolate a reversibly thermochromic microencapsulated pigment 1E.

The average particle size of the microencapsulated pigment 1E was 2.0 μm, and the mass ratio of the reversibly thermochromic composition to the microcapsule wall film was 2.6:1.0. Further, a hysteresis property of $t_1$: −14° C., $t_2$: −6° C., $t_3$: 48° C., $t_4$: 62° C., ΔH: 65° C. was exhibited, and the color changed from blue to colorless, and colorless to blue reversibly.

Production of Writing Tool

A reversibly thermochromic aqueous ink composition was prepared by mixing 25.7 parts of the reversibly thermochromic microencapsulated pigment 1E (cooled in advance to −14° C. or lower to develop a blue color), 0.2 part of succinoglycan (shear-rate thinning agent), 5.5 parts of urea, 7.5 parts of glycerine, 0.2 part of a modified silicone-based antifoaming agent, 0.1 part of an antifungal agent, 1.0 part of a lubricant, 1.0 part of triethanolamine, and 58.8 parts of water.

The ink composition was sucked into a polypropylene tube with an inner diameter of 4.4 mm, then the tube was connected with a ballpoint pen tip through the intermediary of a resin-made holder.

Next, an ink backflow preventer (liquid stopper) with viscoelasticity containing polybutene as a main component was filled into the polypropylene tube from the rear side.

Then, a tail plug was inserted into the rear end of the tube, a frontal shaft and a rear shaft were assembled, and a cap was put on. Finally, a deaeration treatment by a centrifugal treatment was carried out to obtain a writing tool (ballpoint pen).

The ballpoint pen tip was configured such that a metal was cut to form a tip with a ball seat and an ink dispensing port, and a stainless steel ball with a diameter of 0.5 mm was retained at the frontal end of the tip. The ball was pushed forward by a spring body, and further a SEBS-made friction member was fixed to the rear part of the rear shaft as a friction body.

The stamp and the writing tool were combined to yield a stamp set.

Blue letters (script) were written on paper using the writing tool, and then a stamp image was formed using the stamp.

The script and the stamp image were decolored to a colorless state by heating with an electrically heated color changing device provided with a resistance heating element and a heating roller, and this state could be maintained at room temperature.

In this regard, when the decolored paper was placed in a freezer and chilled to a temperature of −14° C. or lower, the script and the stamp image appeared again, and such behavior could be reproduced repeatedly.

Next, letters (script) were written on paper using the writing tool. Then using the stamp, a stamp image was formed. When the script and the stamp image were rubbed with a friction member placed on the writing tool, the script was erased by friction heat. Meanwhile, although the stamp image was decolored slightly by friction heat, the color recovered soon, because a completely decolored temperature was not arrived at. It was not possible to judge the authenticity from the color change behavior.

Example 1-8

Preparation of Ink Composition for Reversibly Thermochromic Stamp

Firstly, 25.0 parts of the microencapsulated pigment 1D prepared in Example 1-4 (cooled in advance to 6° C. or lower to develop a blue color), 50.0 parts of glycerine, 0.5 part of xanthan gum, 0.5 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 13.1 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 10,500 mPa·s, and the ink viscosity measured at 60 rpm was 1,750 mPa·s, and the thixotropy (ink viscosity measured at 6 rpm/ink viscosity measured at 60 rpm) was 6.0.

Production of Stamp

A stamp was obtained by impregnating the ink composition into a stamp material having continuous pores, fixing the same to a stamp main body to expose a stamp face of the stamp material, and putting a tail plug and a cap on.

When the stamp was pressed to a target surface (paper), the ink was not supplied to the stamp face in a uniform condition, and therefore an initial stamp image was not uniform and a clear image could not be formed.

Moreover, when stamping was made successively, since the ink was not dispensed smoothly, clear stamp images could not be formed successively, and the stamp image became thinner by every stamping forming an unclear stamp image.

Example 1-9

Preparation of Ink Composition for Reversibly Thermochromic Stamp

Firstly, 25.0 parts of the microencapsulated pigment 1D prepared in Example 1-4 (cooled in advance to 6° C. or lower to develop a blue color), 50.0 parts of glycerine, 0.2 part of sodium alginate, 0.5 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 13.4 parts of water were mixed to yield an ink composition for a reversibly thermochromic stamp.

The ink viscosity measured at 6 rpm for the yielded ink composition for a reversibly thermochromic stamp at 25° C. with a BL-type viscometer was 1,300 mPa·s, and the ink viscosity measured at 60 rpm was 920 mPa·s, and the thixotropy (ink viscosity measured at 6 rpm/ink viscosity measured at 60 rpm) was 1.41.

Production of Stamp

A stamp was obtained by impregnating the ink composition into a stamp material having continuous pores, fixing the same to a stamp main body to expose a stamp face of the stamp material, and putting a tail plug and a cap on.

When the stamp was pressed repeatedly to a target surface (paper), the ink composition was surely transferred from a stamp face of the stamp material to the target surface to form a stamp image, but due to excessive discharge of the ink the initial stamp image blurred and became unclear, and a clear stamp image could not be obtained.

Further, with respect to the stamp, a microencapsulated pigment in the ink composition sedimented over time, so that a stamp image formation became not any more possible.

Example 2-1

Production of Reversibly Thermochromic Microencapsulated Pigment 2A

A thermochromic color-memory composition, composed of as Component (A) 3.0 parts of 1,3-dimethyl-6-diethylaminofluoran, as Component (B) 3.0 parts of 4,4'-(2-ethylhexane-1,1-diyl)diphenol, and 5.0 parts of 2,2-bis(4'-hydroxyphenyl)hexafluoropropane, and as Component (C) 50.0 parts of 4-benzyloxyphenylethyl caprate was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a thermochromic microcapsule suspension. The yielded suspension was centrifuged to isolate a reversibly thermochromic microcapsule 2A.

The average particle size of the microcapsule was 2.5 μm, and the mass ratio of the reversibly thermochromic composition to the microcapsule wall film was 2.6:1.0. Further, a hysteresis property of $t_1$: −20° C., $t_2$: −10° C., $t_3$: 48° C., $t_4$: 58° C., ΔH: 68° C. was exhibited, and the color changed from orange to colorless, and colorless to orange reversibly.

Preparation of Ink Composition for Reversibly Thermochromic Stamp

Firstly, 20.0 parts of the microencapsulated pigment 2A (cooled in advance to −20° C. or lower to develop an orange color), 50.0 parts of glycerine, 1.5 parts of an alkali-soluble acrylic emulsion (Trade name: PRIMAL DR73, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 16.7 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 4,700 mPa·s, and the ink viscosity measured at 60 rpm was 2,400 mPa·s, and the thixotropy (ink viscosity measured at 6 rpm/ink viscosity measured at 60 rpm) was 1.95. The pH at 25° C. was 8.7.

Figure 6:
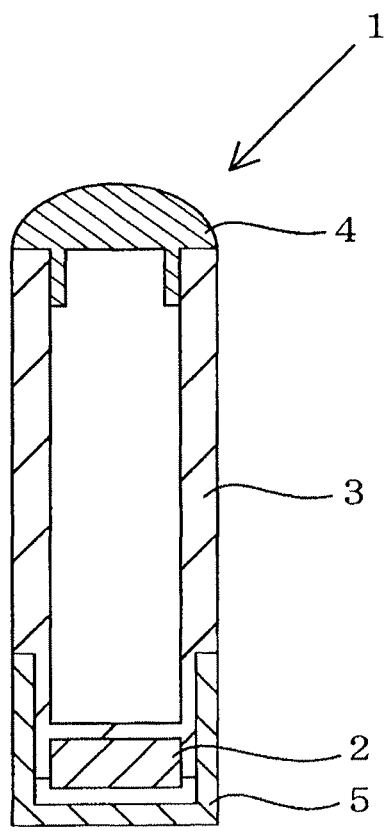
FIG. 6 is an explanatory longitudinal cross-sectional view showing an Example of stamp containing an ink composition for a reversibly thermochromic stamp.

Production of Stamp (See FIG. 6)

A stamp was obtained by impregnating the ink composition into a stamp material having continuous pores, fixing the same to a stamp main body to expose a stamp face of the stamp material, and putting a cap on.

A SEBS resin-made friction member was placed as a tail plug at the rear end of the stamp main body.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by rubbing the same with a friction member provided on the stamp, and this state could be maintained at room temperature.

When the decolored paper sheet was placed in a freezer to be chilled to a temperature of −20° C. or lower, the stamp image exhibited a color change behavior to return to an orange color, and this behavior could be reproduced repeatedly.

Example 2-2

Production of Reversibly Thermochromic Microencapsulated Pigment 2B

A solution prepared by dissolving by heating a thermochromic color-memory composition, composed of as Component (A) 1.0 part of 2-(dibutylamino)-8-(dipentylamino)-4-methyl-spiro[5H-[1]benzopyrano[2,3-g]pyrimidine-5,1'(3'H)-isobenzofuran]-3-one, as Component (B) 3.0 parts of 4,4'-(2-ethylhexane-1,1-diyl)diphenol, and 5.0 parts of 2,2-bis(4'-hydroxyphenyl)hexafluoropropane, and as Component (C) 50.0 parts by mass of 4-benzyloxyphenylethyl caprate, and mixing as a wall film material 30.0 parts by mass of an aromatic isocyanate prepolymer, and 40.0 parts by mass of a co-solvent, was emulsified in a 8% poly(vinyl alcohol) aqueous solution, stirred with heating, then after addition of 2.5 parts by mass of a water-soluble aliphatic-modified amine, further stirred to yield a thermochromic microcapsule suspension. The yielded suspension was centrifuged to isolate a reversibly thermochromic microcapsule 2B.

The average particle size of the microcapsule 2B was 2.3 μm, and the mass ratio of the reversibly thermochromic composition to the microcapsule wall film was 2.6:1.0. Further, a hysteresis property of $t_1$: −20° C., $t_2$: −10° C., $t_3$: 48° C., $t_4$: 58° C., ΔH: 68° C. was exhibited, and the color changed from pink to colorless, and colorless to pink reversibly.

Preparation of Ink Composition for Reversibly Thermochromic Stamp

Firstly, 18.0 parts of the microencapsulated pigment 2B (cooled in advance to −20° C. or lower to develop a pink color), 50.0 parts of glycerine, 3.3 parts of an alkali-soluble acrylic emulsion (Trade name: PRIMAL TT935, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 16.9 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 4,000 mPa·s, and the ink viscosity measured at 60 rpm was 3,000 mPa·s, and the thixotropy (ink viscosity measured at 6 rpm/ink viscosity measured at 60 rpm) was 1.33. The pH at 25° C. was 8.0.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by rubbing the same with a friction member provided on the stamp, and this state could be maintained at room temperature.

When the decolored paper sheet was placed in a freezer to be chilled to a temperature of −20° C. or lower, the stamp image exhibited a color change behavior to return to a pink color, and this behavior could be reproduced repeatedly.

Example 2-3

Production of Reversibly Thermochromic Microencapsulated Pigment 2C

A thermochromic color-memory composition, composed of as Component (A) 2.0 parts of 4,5,6,7-tetrachloro-3-[4-(dimethylamino)-2-methylphenyl]-3-(1-ethyl-2-methyl-1H-indol-3-yl)-1(3H)-isobenzofuranone, as Component (B) 3.0 parts of 4,4'-(2-ethylhexane-1,1-diyl)diphenol, and 5.0 parts of 2,2-bis(4'-hydroxyphenyl)hexafluoropropane, and as Component (C) 50.0 parts of 4-benzyloxyphenylethyl caprate was dissolved by heating, and as a wall film material 30.0 parts by mass of an aromatic isocyanate prepolymer, and 40.0 parts by mass of a co-solvent were mixed therewith. The mixture solution was emulsified in a 8% poly (vinyl alcohol) aqueous solution, stirred with heating, then after addition of 2.5 parts by mass of a water-soluble aliphatic-modified amine, further stirred to yield a thermochromic microcapsule suspension. The yielded suspension was centrifuged to isolate a reversibly thermochromic microcapsule 2C.

The average particle size of the microcapsule 2C was 2.2 μm, and the mass ratio of the reversibly thermochromic composition to the microcapsule wall film was 2.6:1.0. Further, a hysteresis property of $t_1$: −20° C., $t_2$: −10° C., $t_3$: 46° C., $t_4$: 56° C., ΔH: 66° C. was exhibited, and the color changed from blue to colorless, and colorless to blue reversibly.

Preparation of Ink Composition for Reversibly Thermochromic Stamp

Firstly, 16.0 parts of the microencapsulated pigment 2C (cooled in advance to −20° C. or lower to develop a blue color), 50.0 parts of glycerine, 4.4 parts of an alkali-soluble acrylic emulsion (Trade name: PRIMAL TT935, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 17.8 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 8,000 mPa·s, and the ink viscosity measured at 60 rpm was 6,600 mPa·s, and the thixotropy (ink viscosity measured at 6 rpm/ink viscosity measured at 60 rpm) was 1.21. The pH at 25° C. was 7.6.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by rubbing the same with a friction member provided on the stamp, and this state could be maintained at room temperature.

When the decolored paper sheet was placed in a freezer to be chilled to a temperature of −20° C. or lower, the stamp image exhibited a color change behavior to return to a blue color, and this behavior could be reproduced repeatedly.

Example 2-4

Production of Reversibly Thermochromic Microencapsulated Pigment 2D

A thermochromic color-memory composition, composed of as Component (A) 3.0 parts of 4-[2,6-bis(2-ethoxyphenyl)-4-pyridinyl]-N,N-dimethylbenzeneamine, as Component (B) 10.0 parts of 2,2-bis(4'-hydroxyphenyl)hexafluoropropane, and as Component (C) 50.0 parts of 4-benzyloxyphenylethyl caprate was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a thermochromic microcapsule suspension. The suspension was centrifuged to isolate a reversibly thermochromic microcapsule 2D.

The average particle size of the microcapsule 2D was 2.5 μm, and the mass ratio of the reversibly thermochromic composition to the microcapsule wall film was 2.6:1.0. Further, a hysteresis property of $t_1$: −20° C., $t_2$: −10° C., $t_3$: 48° C., $t_4$: 58° C., ΔH: 68° C. was exhibited, and the color changed from yellow to colorless, and colorless to yellow reversibly.

Preparation of Ink Composition for Reversibly Thermochromic Stamp

Firstly, 20.0 parts of the microencapsulated pigment 2D (cooled in advance to −20° C. or lower to develop a yellow color), 50.0 parts of glycerine, 1.6 parts of an alkali-soluble acrylic emulsion (Trade name: PRIMAL TT935, Rohm and Haas Japan K.K.), 0.8 part of alkali-soluble acrylic emulsion (Trade name: PRIMAL DR73, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 15.8 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 5,500 mPa·s, and the ink viscosity measured at 60 rpm was 3,550 mPa·s, and the thixotropy (ink viscosity measured at 6 rpm/ink viscosity measured at 60 rpm) was 1.55. The pH at 25° C. was 8.3.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by rubbing the same with a friction member provided on the stamp, and this state could be maintained at room temperature.

When the decolored paper sheet was placed in a freezer to be chilled to a temperature of −20° C. or lower, the stamp image exhibited a color change behavior to return to a yellow color, and this behavior could be reproduced repeatedly.

Example 2-5

Production of Reversibly Thermochromic Microencapsulated Pigment 2E

A thermochromic color-memory composition, composed of as Component (A) 4.5 parts of 2-(2-chloroamino)-6-dibutylaminofluoran, as Component (B) 3.0 parts of 4,4'-(2-ethylhexane-1,1-diyl)diphenol, and 5.0 parts of 2,2-bis(4'-hydroxyphenyl)hexafluoropropane, and as Component (C) 50.0 parts of 4-benzyloxyphenylethyl caprate was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a thermochromic microcapsule suspension. The suspension was centrifuged to isolate a reversibly thermochromic microcapsule 2E.

The average particle size of the microcapsule 2E was 2.4 µm, and the mass ratio of the reversibly thermochromic composition to the microcapsule wall film was 2.6:1.0. Further, a hysteresis property of $t_1$: −20° C., $t_2$: −10° C., $t_3$: 46° C., $t_4$: 56° C., ΔH: 66° C. was exhibited, and the color changed from black to colorless, and colorless to black reversibly.

Preparation of Ink Composition for Reversibly Thermochromic Stamp

Firstly, 18.0 parts of the microencapsulated pigment 2E (cooled in advance to −20° C. or lower to develop a black color), 50.0 parts of glycerine, 5.5 parts of an alkali-soluble acrylic emulsion (Trade name: PRIMAL TT935, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 14.7 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 10,000 mPa·s, and the ink viscosity measured at 60 rpm was 9,000 mPa·s, and the thixotropy (ink viscosity measured at 6 rpm/ink viscosity measured at 60 rpm) was 1.11. The pH at 25° C. was 7.2.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by rubbing the same with a friction member provided on the stamp, and this state could be maintained at room temperature.

When the decolored paper sheet was placed in a freezer to be chilled to a temperature of −20° C. or lower, the stamp image exhibited a color change behavior to return to a black color, and this behavior could be reproduced repeatedly.

Example 2-6

Preparation of Ink Composition for Reversibly Thermochromic Stamp

Firstly, 25.0 parts of the microencapsulated pigment 2E prepared in Example 2-5 (cooled in advance to −20° C. or lower to develop a black color), 50.0 parts of glycerine, 1.1 parts of an alkali-soluble acrylic emulsion (Trade name: PRIMAL DR73, Rohm and Haas Japan K.K.), 0.9 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 12.1 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 3,000 mPa·s, and the ink viscosity measured at 60 rpm was 1,500 mPa·s, and the thixotropy (ink viscosity measured at 6 rpm/ink viscosity measured at 60 rpm) was 2.0. The pH at 25° C. was 8.9.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed repeatedly to a target surface (paper), the ink composition was dispensed smoothly from a stamp face of the stamp material and transferred to the target surface, so that clear stamp images could be successively formed without blurring of the stamp image.

The stamp image was decolored to a colorless state by rubbing the same with a friction member provided on the stamp, and this state could be maintained at room temperature.

When the decolored paper sheet was placed in a freezer to be chilled to a temperature of −20° C. or lower, the stamp image exhibited a color change behavior to return to a black color, and this behavior could be reproduced repeatedly.

Comparative Example 2-1

Preparation of Ink Composition for Reversibly Thermochromic Stamp

Firstly, 25.0 parts of the microencapsulated pigment 2E prepared in Example 2-5 (cooled in advance to −20° C. or lower to develop a black color), 50.0 parts of glycerine, 0.5 part of xanthan gum, 0.5 part of triethanolamine, 10.0 parts of a 50% aqueous solution of poly(vinyl pyrrolidone), 0.2 part of a silicon-based antifoaming agent, 0.5 part of a penetration leveling agent, 0.2 part of an antiseptic agent, and 13.1 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 10,500 mPa·s, and the ink viscosity measured at 60 rpm was 1,750 mPa·s, and the thixotropy (ink viscosity measured at 6 rpm/ink viscosity measured at 60 rpm) was 6.0.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed to a target surface (paper), the ink was not supplied to the stamp face in a uniform condition, and therefore an initial stamp image was not uniform and a clear image could not be formed.

Moreover, when stamping was made successively, since the ink was not dispensed smoothly, clear stamp images could not be formed successively, and the stamp image became thinner by every stamping forming an unclear stamp image.

Comparative Example 2-2

Preparation of Ink Composition for Reversibly Thermochromic Stamp

Firstly, 25.0 parts of the microencapsulated pigment 2E prepared in Example 2-5 (cooled in advance to −20° C. or lower to develop a black color), 50.0 parts of glycerine, 0.2 part of sodium alginate, 0.5 part of triethanolamine, 10.0 parts of a 50% aqueous solution of poly(vinylpyrrolidone), 0.2 part of a silicon-based antifoaming agent, 0.5 part of a penetration leveling agent, 0.2 part of an antiseptic agent, and 13.4 parts of water were mixed to yield an ink composition for a reversibly thermochromic stamp.

The ink viscosity of the yielded ink composition for a reversibly thermochromic stamp was measured at 25° C. with a BL-type viscometer. The ink viscosity measured at 6 rpm was 1,300 mPa·s, and the ink viscosity measured at 60 rpm was 920 mPa·s, and the thixotropy (ink viscosity measured at 6 rpm/ink viscosity measured at 60 rpm) was 1.41.

Production of Stamp

A stamp was obtained by impregnating the ink composition into a stamp material having continuous pores, fixing the same to a stamp main body to expose a stamp face of the stamp material, and putting a cap on.

A SEBS resin-made friction member was placed at the rear end of the stamp main body.

When the stamp was pressed repeatedly to a target surface (paper), the ink composition was surely transferred from a stamp face of the stamp material to the target surface to form a stamp image, but due to excessive discharge of the ink the initial stamp image blurred to become unclear and a clear stamp image could not be obtained.

Further, with respect to the stamp, a microencapsulated pigment in the ink composition sedimented over time, so that a stamp image formation became not any more possible.

Reference Example 3-1

Production of Reversibly Thermochromic Microencapsulated Pigment 3A

A reversibly thermochromic composition having color memory, composed of as Component (A) 2.5 parts of 1,3-dimethyl-6-diethylaminofluoran, as Component (B) 5.0 parts of 2,2-bis(4'-hydroxyphenyl)hexafluoropropane, and 3.0 parts of 1,1-bis(4'-hydroxyphenyl)-n-decane, and as Component (C) 50.0 parts of 4-benzyloxyphenylethyl caprate was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts by mass of a water-soluble aliphatic-modified amine, further stirred to yield a reversibly thermochromic microcapsule suspension. The suspension was filtrated by a filter to isolate a reversibly thermochromic microencapsulated pigment 3A.

The average particle size D of the microencapsulated pigment 3A was 0.1 μm, and the mass ratio of the reversibly thermochromic composition to the microcapsule wall film was 2.6:1.0. Further, a hysteresis property of $t_1$: −45° C., $t_2$: −23° C., $t_3$: 45° C., $t_4$: 64° C. was exhibited, and the color changed from orange to colorless, and colorless to orange reversibly.

Reference Example 3-2

Production of Reversibly Thermochromic Microencapsulated Pigment 3B

A reversibly thermochromic composition having color memory, composed of as Component (A) 2.0 parts of 4,5,6,7-tetrachloro-3-[4-(diethylamino)-2-methylphenyl]-3-(1-ethyl-2-methyl-1H-indol-3-yl)-1(3H)-isobenzofuranone, as Component (B) 5.0 parts of 2,2-bis(4'-hydroxyphenyl)hexafluoropropane, and 3.0 parts of 1,1-bis(4'-hydroxyphenyl)-n-decane, and as Component (C) 50.0 parts of 4-benzyloxyphenylethyl caprate was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts of a water-soluble aliphatic-modified amine, further stirred to yield a reversibly thermochromic microencapsulated pigment suspension. The suspension was filtrated by a filter to isolate a reversibly thermochromic microencapsulated pigment 3B.

The average particle size D of the microencapsulated pigment was 0.5 μm, and the mass ratio of the reversibly thermochromic composition to the microcapsule wall film was 2.6:1.0. Further, a hysteresis property of $t_1$: −40° C., $t_2$: −20° C., $t_3$: 45° C., $t_4$: 64° C. was exhibited, and the color changed from blue to colorless, and colorless to blue reversibly.

Reference Example 3-3

Production of Reversibly Thermochromic Microencapsulated Pigment 3C

A reversibly thermochromic composition having color memory, composed of as Component (A) 1 part of 3-(2-ethoxy-4-diethylaminophenyl)-3-(1-ethyl-2-methylindol-3-yl)-4-azaphthalide, as Component (B) 5.0 parts of 2,2-bis(4-hydroxyphenyl)hexafluoropropane, and as Component (C) 50 parts of a diester compound of succinic acid and 2-phenoxyethanol was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts of a water-soluble aliphatic-modified amine, further stirred to yield a reversibly thermochromic microencapsulated pigment suspension. The suspension was filtrated by a filter to isolate a reversibly thermochromic microencapsulated pigment 3C.

The average particle size D of the microencapsulated pigment was 1.0 μm, and the mass ratio of the reversibly thermochromic composition to the microcapsule wall film was 2.6:1.0. Further, a hysteresis property of $t_1$: 3° C., $t_2$: 5° C., $t_3$: 92° C., $t_4$: 106° C. was exhibited, and the color changed from blue to colorless, and colorless to blue reversibly.

Reference Example 3-4

Production of Reversibly Thermochromic Microencapsulated Pigment 3D

A reversibly thermochromic composition having color memory, composed of as Component (A) 1 part of 3-(2- ethoxy-4-diethylaminophenyl)-3-(1-ethyl-2-methylindol-3-yl)-4-azaphthalide, as Component (B) 5.0 parts of 2,2-bis(4-hydroxyphenyl)hexafluoropropane, and as Component (C) 50.0 parts of cyclohexylmethyl 4-biphenylacetate, and 5.0 parts of p-methyl benzyl stearate was dissolved by heating, and as a wall film material 30.0 parts of an aromatic isocyanate prepolymer, and 40.0 parts of a co-solvent were mixed therewith. The mixture solution was emulsified in a 8% poly(vinyl alcohol) aqueous solution, stirred with heating, then after addition of 2.5 parts of a water-soluble aliphatic-modified amine, further stirred to yield a reversibly thermochromic microencapsulated pigment suspension. The suspension was filtrated by a filter to isolate a reversibly thermochromic microencapsulated pigment 3D.

The average particle size D of the microencapsulated pigment was 2.0 μm, and the mass ratio of the reversibly thermochromic composition to the microcapsule wall film was 2.6:1.0. Further, a hysteresis property of $t_1$: −18° C., $t_2$: −12° C., $t_3$: 42° C., $t_4$: 66° C. was exhibited, and the color changed from blue to colorless, and colorless to blue reversibly.

Reference Example 3-5

Production of Reversibly Thermochromic Microencapsulated Pigment 3E

A reversibly thermochromic composition having color memory, composed of as Component (A) 2.5 parts of 1,3-dimethyl-6-diethylaminofluoran, as Component (B) 5.0 parts of 2,2-bis(4'-hydroxyphenyl)hexafluoropropane, and 3.0 parts of 1,1-bis(4'-hydroxyphenyl)-n-decane, and as Component (C) 50.0 parts of 4-benzyloxyphenylethyl caprate was dissolved by heating, and as a wall film material 30.0 parts of an aromatic isocyanate prepolymer, and 40.0 parts of a co-solvent were mixed therewith. The mixture solution was emulsified in a 8% poly(vinyl alcohol) aqueous solution, stirred with heating, then after addition of 2.5 parts of a water-soluble aliphatic-modified amine, further stirred to yield a reversibly thermochromic microencapsulated pigment suspension. The suspension was filtrated by a filter to isolate a reversibly thermochromic microencapsulated pigment 3E.

The average particle size D of the microencapsulated pigment was 5.0 μm, and the mass ratio of the reversibly thermochromic composition to the microcapsule wall film was 2.6:1.0. Further, a hysteresis property of $t_1$: −12° C., $t_2$: −4° C., $t_3$: 50° C., $t_4$: 58° C. was exhibited, and the color changed from orange to colorless, and colorless to orange reversibly.

Reference Example 3-6

Production of Reversibly Thermochromic Microencapsulated Pigment 3F

A reversibly thermochromic material, composed of as Component (A) 4.5 parts of 2-(2-chloroanilino)-6-di-n-butylaminofluoran, as Component (B) 6.0 parts of 1,1-bis(4-hydroxyphenyl)-2-methylpropane, and as Component (C) 50.0 parts of p-methylbenzyl palmitate was dissolved by heating, and as a wall film material 30.0 parts by mass of an aromatic isocyanate prepolymer, and 40.0 parts by mass of a co-solvent were mixed therewith. The mixture solution was emulsified in a 8% poly(vinyl alcohol) aqueous solution, stirred with heating, then after addition of 2.5 parts of a water-soluble aliphatic-modified amine, further stirred to yield a reversibly thermochromic microencapsulated pigment suspension. The suspension was filtrated by a filter to isolate a reversibly thermochromic microencapsulated pigment 3F.

The average particle size D of the microencapsulated pigment was 9.0 μm, and the mass ratio of the reversibly thermochromic composition to the microcapsule wall film was 2.6:1.0. Further, a hysteresis property of $t_1$: 3° C., $t_2$: 10° C., $t_3$: 38° C., $t_4$: 45° C. was exhibited, and the color changed from black to colorless, and colorless to black reversibly.

Reference Example 3-7

Preparation of Ink Composition I for Reversibly Thermochromic Stamp

| | |
|---|---|
| Microencapsulated pigment 3A | 20 parts by mass |
| Glycerine | 50 parts by mass |
| Alkali-soluble acrylic emulsion (Trade name: PRIMAL DR73, Rohm and Haas Japan K.K.) | 1.5 parts by mass |
| Triethanolamine | 0.2 part by mass |
| Poly(vinylpyrrolidone) 50% aqueous solution | 10 parts by mass |
| Silicone-based antifoaming agent | 0.2 part by mass |
| Penetration leveling agent | 0.5 part by mass |
| Antiseptic agent | 0.2 part by mass, and |
| Water | 16.7 parts by mass |

The above components were mixed to obtain an ink composition I for a reversibly thermochromic stamp.

Reference Example 3-8

Preparation of Ink Composition II for Reversibly Thermochromic Stamp

An ink composition II for a reversibly thermochromic stamp was yielded by the same method as the method for preparing the ink composition I for a reversibly thermochromic stamp except that the microencapsulated pigment 3B was used instead of the microencapsulated pigment 3A.

Reference Example 3-9

Preparation of Ink Composition III for Reversibly Thermochromic Stamp

An ink composition III for a reversibly thermochromic stamp was yielded by the same method as the method for preparing the ink composition I for a reversibly thermochromic stamp except that the microencapsulated pigment 3C was used instead of the microencapsulated pigment 3A.

Reference Example 3-10

Preparation of Ink Composition IV for Reversibly Thermochromic Stamp

An ink composition IV for a reversibly thermochromic stamp was yielded by the same method as the method for preparing the ink composition I for a reversibly thermochromic stamp except that the microencapsulated pigment 3D was used instead of the microencapsulated pigment 3A.

Reference Example 3-11

Preparation of Ink Composition V for Reversibly Thermochromic Stamp

An ink composition V for a reversibly thermochromic stamp was yielded by the same method as the method for preparing the ink composition I for a reversibly thermochromic stamp except that the microencapsulated pigment 3E was used instead of the microencapsulated pigment 3A.

Reference Example 3-12

Preparation of Ink Composition VI for Reversibly Thermochromic Stamp

An ink composition VI for a reversibly thermochromic stamp was yielded by the same method as the method for preparing the ink composition I for a reversibly thermochromic stamp except that the microencapsulated pigment 3F was used instead of the microencapsulated pigment 3A.

Example 3-1

Production of Reversibly Thermochromic Stamp (See FIG. 6)

A stamp was obtained by impregnating the ink composition I for a reversibly thermochromic stamp (microencapsulated pigment 3A, average particle size D: 0.1 μm) into a stamp material having continuous pores (stamp material a: ethylene vinyl acetate copolymer, Sm of ink impregnating surface: 17.5, Ra of ink non-impregnating surface: 0.47), fixing the same to a stamp main body to expose a stamp face, and putting a cap on. In this regard, a SEBS resin-made friction member was placed as a tail plug at the rear end of the stamp main body.

Examples 3-2 to 3-11, and Comparative Examples 3-1 to 3-3

Reversibly thermochromic stamps were produced identically with the method of Example 1 using the ink compositions for a reversibly thermochromic stamp and the stamp materials set forth in the following Table 1.

TABLE 1

| | Example 3-1 | Example 3-2 | Example 3-3 | Example 3-4 | Example 3-5 | Example 3-6 | Example 3-7 | Example 3-8 | Example 3-9 | Example 3-10 | Example 3-11 | Comparative Example 3-1 | Comparative Example 3-2 | Comparative Example 3-3 |
|---|---|---|---|---|---|---|---|---|---|---|---|---|---|---|
| Reversibly thermochromic ink composition | I | IV | III | III | II | II | I | V | IV | I | V | VI | V | V |
| Stamp material | a | c | b | c | b | d | d | d | a | e | e | e | c | a |
| $P = Sm^2/D^2$ | 30,625 | 159 | 361 | 635 | 1,444 | 3,272 | 81,796 | 33 | 77 | 121,801 | 49 | 15 | 25 | 12 |
| Clearness | B | A | A | A | A | A | B | C | C | C | B | D | D | D |
| Resolution | B | A | A | A | A | A | B | A | A | C | C | D | D | D |
| Blurring (bleed-through) | B | A | A | A | A | B | B | A | A | C | A | — | — | — |
| Successive stamping performance | A | A | A | A | A | A | A | C | C | A | A | D | D | D |
| Fouling | A | A | A | A | A | A | A | A | A | C | C | — | — | — |
| Rating | B | A | A | A | A | B | B | C | C | C | C | D | D | D |

Stamp material a: ethylene vinyl acetate copolymer, Sm of ink impregnating surface = 17.5, Ra of ink non-impregnating surface = 0.47
Stamp material b: ethylene vinyl acetate copolymer, Sm of ink impregnating surface = 19.1, Ra of ink non-impregnating surface = 0.55
Stamp material c: ethylene vinyl acetate copolymer, Sm of ink impregnating surface = 25.2, Ra of ink non-impregnating surface = 0.60
Stamp material d: ethylene vinyl acetate copolymer, Sm of ink impregnating surface = 28.6, Ra of ink non-impregnating surface = 0.61
Stamp material e: ethylene vinyl acetate copolymer, Sm of ink impregnating surface = 34.9, Ra of ink non-impregnating surface = 2.02
Ink composition I for reversibly thermochromic stamp: microencapsulated pigment 3A, average particle size D = 0.1 μm
Ink composition II for reversibly thermochromic stamp: microencapsulated pigment 3B, average particle size D = 0.5 μm
Ink composition III for reversibly thermochromic stamp: microencapsulated pigment 3C, average particle size D = 1.0 μm
Ink composition IV for reversibly thermochromic stamp: microencapsulated pigment 3D, average particle size D = 2.0 μm
Ink composition V for reversibly thermochromic stamp: microencapsulated pigment 3E, average particle size D = 5.0 μm
Ink composition VI for reversibly thermochromic stamp: microencapsulated pigment 3F, average particle size D = 9.0 μm Stamp images were formed by stamping on fine quality paper with the solid writing material obtained in Examples 3-1 to 3-11 and Comparative Examples 3-1 to 3-3, and further with the obtained stamps. The formed stamp images were evaluated visually in terms of clearness, resolution (sharpness), blurring (bleed-through), and fouling. Further, successive stamping performance was also evaluated visually. The results are shown in Table 1 above.

Clearness

A: A bright stamp image is obtained, and the color optical density is sufficient.
B: The brightness is slightly inadequate, but the color optical density of the stamp image is sufficient.
C: The coloring of a stamp image is inadequate, however recognizable.
D: A stamp image is not obtained, and not recognizable.

Resolution (Sharpness)

A: The edge of a stamp image is sharp and the resolution is high.
B: The sharpness at the edge of a stamp image is inadequate, but the resolution is sufficient.
C: The resolution of a stamp image is slightly inadequate, but the stamp image is still recognizable.
D: A stamp image was not obtained, or, even if obtained, the resolution is so poor that a stamp image is not recognizable as an image.

Blurring (Bleed-Through)

A: There is no blurring in a stamp image, nor ink bleed-through. An excellent stamp image is obtained.
B: There is no blurring in a stamp image, but some ink bleed-through is recognized.
C: There is blurring and ink bleed-through in a stamp image, however the stamp image is recognizable as an image.
D: There is blurring of a stamp image, and a stamp image is not recognizable as an image.

Fouling

A: Outside a stamp image there is no visible fouling with an ink, and an excellent stamp image is obtained.
B: Outside a stamp image there is some visible fouling with an ink, however a stamp image is satisfactory.
C: Outside a stamp image there is some visible fouling with an ink, however a stamp image is still recognizable as an image.
D: Outside a stamp image there is visible fouling with an ink, and a stamp image is not recognizable.

Successive Stamping Performance

Stamping was conducted 100 times successively using an obtained stamp on fine quality paper and the resulted stamp images were evaluated visually.

A: Stamp images are not mottled, and there is substantially no change among stamp images stamped successively to indicate that excellent stamp images have been yielded successively.
B: Although stamp images are slightly mottled, there is substantially no change among stamp images stamped successively to indicate that excellent stamp images have been yielded successively.
C: Stamp images are mottled, and there is density difference among stamp images stamped successively, however successive stamp images are recognizable.
D: There is a thinned or partly broken area in a stamp image, and each stamp image is not recognizable as an image.

As obvious also from the results in Table 1, a reversibly thermochromic stamp according to the present invention is superior to reversibly thermochromic stamps of Comparative Examples in any property.

Application Example 3-1

Production of Reversibly Thermochromic Stamp
(See FIG. 4)

A stamp was obtained by impregnating the ink composition IV for a reversibly thermochromic stamp (microencapsulated pigment 3D, average particle size D: 2.0 μm) into a stamp material c having continuous pores (ethylene vinyl acetate copolymer, Sm of ink impregnating surface: 25.2, Ra of ink non-impregnating surface: 0.60), and further into a reservoir 6 having continuous pores and a porosity higher than the stamp material, inserting the reservoir in the stamp main body 3, fixing the stamp material c in contact with the reservoir, and putting a cap 5 on.

In this regard, a SEBS resin-made friction member was placed as a tail plug 4 at the rear end of the stamp main body 3. When the stamp was pressed repeatedly to fine quality paper, namely a surface to be stamped, the ink composition was dispensed smoothly from a stamp face of the stamp material and transferred to the fine quality paper, so that clear and high-resolution stamp images could be successively formed without blurring of the stamp image. The stamp image was decolored to a colorless state by rubbing with a friction member attached on the stamp, and this state could be maintained at room temperature. When the decolored paper sheet was placed in a freezer to be chilled to a temperature of −20° C. or lower, the stamp image exhibited a color change behavior to return to a blue color, and this behavior could be reproduced repeatedly.

Application Example 3-2

Production of Writing Tool

A reversibly thermochromic aqueous ink composition was prepared by mixing 25.7 parts of the reversibly thermochromic microencapsulated pigment D, 0.2 part of succinoglycan (shear-rate thinning agent), 5.5 parts of urea, 7.5 parts of glycerine, 0.2 part of a modified silicone-based antifoaming agent, 0.1 part of an antifungal agent, 1.0 part of a lubricant, 1.0 part of triethanolamine, and 58.8 parts of water.

The ink composition was sucked into a polypropylene tube with an inner diameter of 4.4 mm, then the tube was connected with a ballpoint pen tip through the intermediary of a resin-made holder. Next, an ink follower (liquid stopper) with viscoelasticity containing polybutene as a main component was filled into the polypropylene tube from the rear side. Then, a tail plug was inserted into the rear end of the tube, a frontal shaft and a rear shaft were assembled, and a cap was put on. Finally, a deaeration treatment by a centrifugal treatment was carried out to obtain a writing tool (ballpoint pen).

The ballpoint pen tip was configured such that a metal was cut to form a tip with a ball seat and an ink dispensing port, and a stainless steel ball with a diameter of 0.4 mm was retained at the frontal end of the tip. The ball was pushed forward by a spring body, and further a SEBS-made friction member was fixed to the rear part of the rear shaft as a friction body.

Production of Stamp Set

The reversibly thermochromic stamp of Example 4 and the writing tool were combined to yield a stamp set. Blue letters (script) were written on paper using the writing tool, and then a stamp image was formed using the stamp.

The script and the stamp image were decolored to a colorless state by heating with an electrically heated color changing device provided with a resistance heating element and a heating roller, and this state could be maintained at room temperature.

In this regard, when the decolored paper was placed in a freezer and chilled at −20° C., the script and the stamp image appeared again, and such behavior could be reproduced repeatedly.

Next, letters (script) were written on paper using the writing tool. Then using the stamp, a stamp image was formed. When the script and the stamp image were rubbed with a friction member placed on the writing tool, the script was erased by friction heat. Meanwhile, although the stamp image was decolored slightly by friction heat, the color recovered soon, because a completely decolored temperature was not arrived at. It was not possible to judge the authenticity from the color change behavior.

The invention claimed is:

1. A stamp being provided with a stamp material having continuous pores, wherein:
    the stamp material has an ink impregnating surface with pores allowing impregnation of an ink, and an ink non-impregnating surface rejecting impregnation of an ink;
    the stamp material is impregnated with an ink composition comprising:
        a reversibly thermochromic microencapsulated pigment encapsulating a reversibly thermochromic composition comprising:
            Component (A): an electron-donating color-developing organic compound,
            Component (B): an electron-accepting compound, and
            Component (C): a reaction medium causing reversibly an electron transfer reaction between the Component (A) and the Component (B) in a specific temperature range;
        water, and
        a thickener,
    wherein:
        an ink composition viscosity measured at 25° C. with a BL-type viscometer at 6 rpm is from 3,500 to 7,000 mPa·s, and a thixotropy expressed by (ink composition viscosity measured at 6 rpm)/(ink composition viscosity measured at 60 rpm) is from 1.2 to 2.0;
    P expressed by the following formula is from 90 to 100,000:

$P = Sm^2/D^2$ wherein Sm stands for an average distance of depressions and projections of the ink impregnating surface of the stamp material and is 30 μm or less, and D stands for an average particle size of the microencapsulated pigment and is from 0.1 to 10 μm; and
    a surface roughness Ra of the ink non-impregnating surface is 2 μm or less.

2. The stamp according to claim 1, wherein an ink reservoir communicating with the stamp material is provided at a rear end of the stamp material.

3. The stamp according to claim 1, comprising:
    a reversibly thermochromic microencapsulated pigment encapsulating the reversibly thermochromic composition;
    water; and
    a thickener,
wherein:
    the reversibly thermochromic composition exhibits a $1^{st}$ hue at a temperature $t_1$, and exhibits a $2^{nd}$ hue at a temperature $t_4$ higher than the temperature $t_1$ and coloring can be altered reciprocally between the $1^{st}$ hue and the $2^{nd}$ hue by changing the temperature;
    the reversibly thermochromic composition exhibiting the $1^{st}$ hue at the temperature $t_1$ starts color change at a temperature $t_3$, when the temperature is elevated, and exhibits completely the $2^{nd}$ hue in a temperature range not lower than the temperature $t_4$ higher than the temperature $t_3$;
    the reversibly thermochromic composition exhibiting the $2^{nd}$ hue at the temperature $t_4$ starts color change at a temperature $t_2$, when the composition is cooled, and exhibits completely the $1^{st}$ hue in a temperature range not higher than the temperature $t_1$ lower than the temperature $t_2$;
    a hysteresis property to keep the $1^{st}$ hue or the $2^{nd}$ hue in a temperature range between the temperature $t_2$ and the temperature $t_3$ is indicated; and
    the temperature $t_2$ is a temperature not higher than 10° C., and the temperature $t_4$ is a temperature not lower than 50° C.

4. The stamp according to claim 3, wherein the temperature $t_4$ is from 50 to 95° C., and the stamp further comprises a friction member.

5. The stamp according to claim 3, wherein the temperature $t_4$ is from 50 to 95° C. and the temperature $t_2$ is −50 to 10° C., and the stamp further comprises a friction member.

6. The stamp according to claim 1, wherein the thickener is an alkali-soluble acrylic emulsion.

7. The stamp according to claim 1, wherein Sm is 10 μm or more and 30 μm or less.

8. The stamp according to claim 1, wherein a friction member is placed at a rear end of a stamp main body.

9. The stamp according to claim 8, wherein a material for the friction member is selected from the group consisting of a silicone resin, a styrene ethylene butylene styrene block copolymer, a polyester resin and a polyester elastomer.

* * * * *